(12) United States Patent
Chen et al.

(10) Patent No.: US 9,236,985 B2
(45) Date of Patent: Jan. 12, 2016

(54) METHOD AND APPARATUS FOR CONTROL AND DATA MULTIPLEXING IN A MIMO COMMUNICATION SYSTEM

(75) Inventors: Wanshi Chen, San Diego, CA (US); Xiaoxia Zhang, San Diego, CA (US); Juan Montojo, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 12/764,871

(22) Filed: Apr. 21, 2010

(65) Prior Publication Data

US 2011/0103498 A1    May 5, 2011

Related U.S. Application Data

(60) Provisional application No. 61/172,140, filed on Apr. 23, 2009.

(51) Int. Cl.
*H04W 4/00* (2009.01)
*H04L 5/00* (2006.01)
(Continued)

(52) U.S. Cl.
CPC ............ *H04L 5/0044* (2013.01); *H04B 7/0404* (2013.01); *H04B 7/0689* (2013.01); *H04L 1/06* (2013.01); *H04L 5/0053* (2013.01); *H04L 1/007* (2013.01); *H04L 1/1812* (2013.01)

(58) Field of Classification Search
None
See application file for complete search history.

(56) References Cited

U.S. PATENT DOCUMENTS 8,243,673 B2 * 8/2012 Hoshino ................ 370/329
2007/0149227 A1 * 6/2007 Parizhsky et al. ........... 455/509
(Continued)

FOREIGN PATENT DOCUMENTS

EP    1901496         3/2008
JP    2012521166 A    9/2012
(Continued)

OTHER PUBLICATIONS

Huawei, "Analysis of Multiplexing Schemes of Control and Data in Multi-layer Pusch Transmission", 3GPP Draft, R1-101967 Mux. C0ntr0l Data Multilayer Pusc h, 3rd Generation Partnership Project (3GPP), Mobile Competence Centre , 650, Route Des Lucioles , F-06921 Sophia-Antipolis Cedex , France, vol . RAN WGI, No. Beijing, china, 20100412, Apr. 6, 2010, XP050419306.
(Continued)

*Primary Examiner* — Mohammad Adhami
(74) *Attorney, Agent, or Firm* — Peng Zhu

(57) ABSTRACT

Systems and methodologies are described herein that facilitate control and data multiplexing for uplink (UL) multiple-input-multiple-output (MIMO) communication within a wireless communication system. As described herein, a device conducting uplink MIMO communication in a wireless communication system can multiplex control signaling and data across one or more of a plurality of layers (e.g., corresponding to spatial layers, codewords, etc.) associated with an uplink transmission. Techniques are described herein for selecting layers of a transmission on which to schedule control signaling and selecting offsets to apply to the control signaling scheduled on selected layers. Further, techniques are described herein for leveraging a multi-layer transmission to increase the efficiency of acknowledgement communication. In addition, techniques are described for selecting a modulation and coding scheme (MCS) to apply to control signaling that is combined with data in an uplink multi-layer transmission.

61 Claims, 16 Drawing Sheets

(51) Int. Cl.
*H04L 1/06* (2006.01)
*H04B 7/04* (2006.01)
*H04B 7/06* (2006.01)
*H04L 1/00* (2006.01)
*H04L 1/18* (2006.01)

(56) References Cited

U.S. PATENT DOCUMENTS

| | | |
|---|---|---|
| 2007/0195738 A1 | 8/2007 | Kim |
| 2008/0260059 A1 | 10/2008 | Pan |
| 2008/0275857 A1 | 11/2008 | Dettinger et al. |
| 2010/0002790 A1* | 1/2010 | Onggosanusi et al. ....... 375/260 |
| 2010/0074208 A1 | 3/2010 | Farajidana et al. |
| 2010/0100789 A1* | 4/2010 | Yu et al. .......................... 714/752 |
| 2010/0195624 A1* | 8/2010 | Zhang et al. ................... 370/335 |
| 2011/0292826 A1* | 12/2011 | Ahn et al. ....................... 370/252 |

FOREIGN PATENT DOCUMENTS

| | | |
|---|---|---|
| RU | 2323525 C2 | 4/2008 |
| WO | 2005032001 A1 | 4/2005 |
| WO | 2007087540 A2 | 8/2007 |
| WO | WO2008045001 A1 | 4/2008 |
| WO | 2008147121 A1 | 12/2008 |
| WO | 2010107779 A2 | 9/2010 |

OTHER PUBLICATIONS

International Search Report and Written Opinion—PCT/US2010/032287, International Search Authority—European Patent Office—Feb. 22, 2011.

Notes from uplink control signaling discussions, TSG-RAN WGl 50 R1-073842, Aug. 20, 2007, XP002621582, Athens, Greece Retrieved from the Internet, URL,http,//www.3gpp.org/ftp/tsg_ran/wgl rl 1/TSGR1_50/Docs/R1-073842.zip.

Samsung, "UE feedback and scheduling considerations for 4-Tx antenna MIMO", 3GPP Draft, R1-063566, 3rd Generation Partnership Project (3GPP), Mobile Competence Centre, 650, Route Des Lucioles, F-06921 Sophia-Antipolis Cedex, France, vol. RAN WGl, No. Riga, Latvia, Nov. 10, 2006, XP05010399.

Taiwan Search Report—TW099113074—TIPO—May 20, 2013.

* cited by examiner

METHOD AND APPARATUS FOR CONTROL AND DATA MULTIPLEXING IN A MIMO COMMUNICATION SYSTEM

CROSS-REFERENCE

This application claims the benefit of U.S. Provisional Application Ser. No. 61/172,140, filed Apr. 23, 2009, and entitled "CONTROL AND DATA MULTIPLEXING FOR UPLINK MULTI-INPUT AND MULTI-OUTPUT COMMUNICATION IN LTE-A," the entirety of which is incorporated herein by reference.

BACKGROUND

I. Field

The present disclosure relates generally to wireless communications, and more specifically to techniques for structuring communication within a multiple-input multiple-output (MIMO) communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-input-single-output (SISO), multiple-input-single-output (MISO), single-input multiple-output (SIMO), or a multiple-input-multiple-output (MIMO) system.

In various wireless communication environments, transmissions are structured using single-carrier waveforms in order to provide benefits such as low peak-to-average power ratios and optimal mobile device transmission efficiency. Conventionally, in the event that both control information and data are to be transmitted on the uplink, a single-carrier transmission waveform is constructed by multiplexing the control information and the data to be transmitted onto a common set of resources. However, in the event that a wireless communication system utilizes MIMO for uplink transmission, such existing techniques for control and data multiplexing become substantially unworkable due to the multiple layers (e.g., corresponding to spatial layers, codewords, etc.) utilized by MIMO systems. Accordingly, it would be desirable to implement techniques by which control and data multiplexing can be performed for uplink MIMO transmission in a wireless communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying control information to be transmitted to one or more network entities; obtaining information relating to a set of layers designated for uplink multiple input multiple output (MIMO) transmission; and selecting respective layers from the set of layers on which to schedule uplink MIMO transmission of at least a portion of the control information.

A second aspect described herein relates to a wireless communications apparatus, which can comprise a memory that stores data relating to control information to be transmitted to one or more network entities and a set of layers designated for uplink MIMO transmission. The wireless communications apparatus can further comprise a processor configured to select respective layers from the set of layers on which to schedule uplink MIMO transmission of at least a portion of the control information.

A third aspect relates to an apparatus, which can comprise means for identifying control signaling to be transmitted in one or more uplink multi-layer transmissions and means for selecting respective layers associated with the one or more uplink multi-layer transmissions on which to schedule at least a portion of the control signaling.

A fourth aspect described herein relates to a computer program product, which can include a computer-readable medium that comprises code for causing a computer to identify control signaling to be transmitted in one or more uplink multi-layer transmissions and code for causing a computer to select respective layers associated with the one or more uplink multi-layer transmissions on which to schedule at least a portion of the control signaling.

According to a fifth aspect, a method is described herein. The method can comprise identifying a transmission provided by a network device over a plurality of layers; determining respective layers corresponding to the transmission to which control information is mapped; and receiving at least a portion of the control information on respective layers to which the control information is determined to be mapped.

A sixth aspect described herein relates to a wireless communications apparatus, which can comprise a memory that stores data relating to a transmission provided by a network device over a plurality of layers. The wireless communications apparatus can further comprise a processor configured to determine respective layers corresponding to the transmission to which control information is mapped and to receive at least a portion of the control information on respective layers to which the control information is determined to be mapped.

A seventh aspect relates to an apparatus, which can comprise means for identifying an uplink multi-layer transmission provided by a network device; means for determining one or more layers in the uplink multi-layer transmission that contain control signaling; and means for processing at least a portion of control signaling contained on one or more determined layers in the uplink multi-layer transmission.

An eighth aspect described herein relates to a computer program product, which can include a computer-readable medium that comprises code for causing a computer to identify an uplink multi-layer transmission provided by a network device; code for causing a computer to determine one or more layers in the uplink multi-layer transmission that contain control signaling; and code for causing a computer to process at least a portion of control signaling contained on one or more determined layers in the uplink multi-layer transmission.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
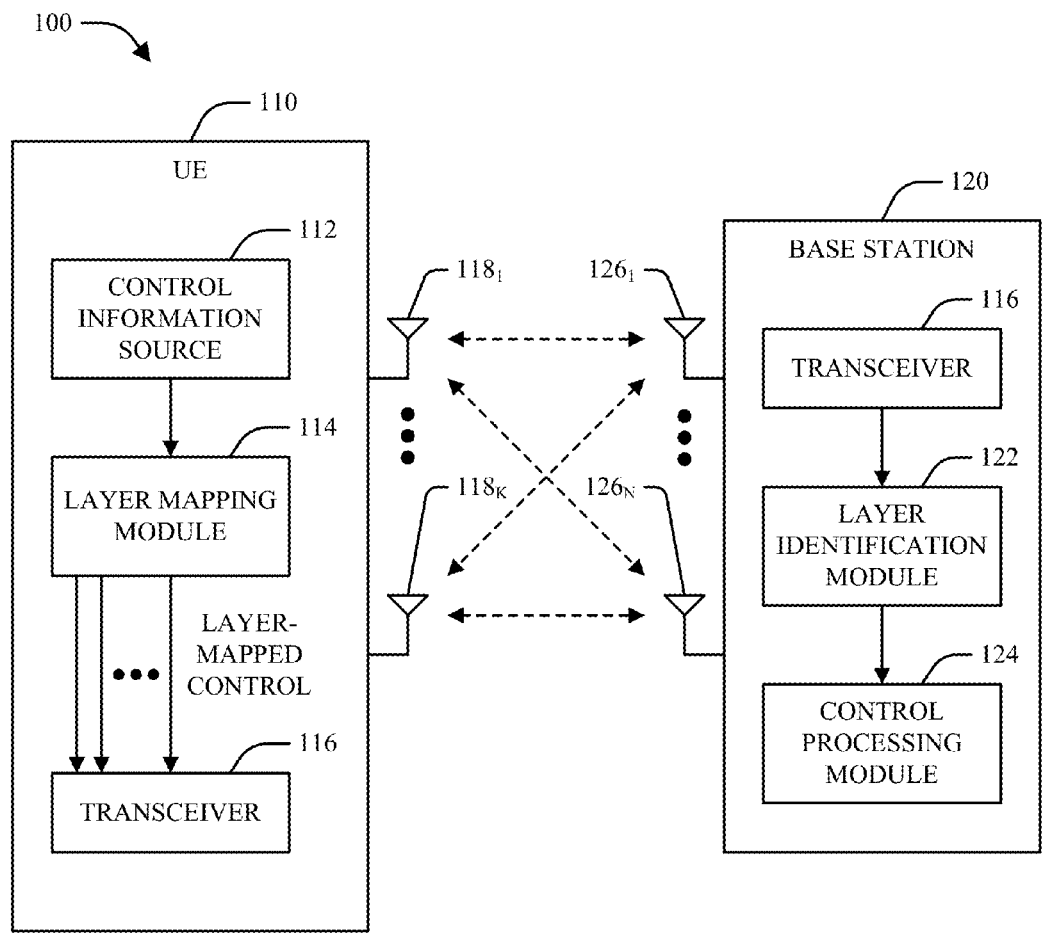
FIG. 1 is a block diagram of a system that facilitates signal construction and uplink transmission in a wireless communication system in accordance with various aspects.

Various aspects of the claimed subject matter are now described with reference to the drawings, wherein like reference numerals are used to refer to like elements throughout.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, Clustered Discrete Fourier Transform (DFT) Spread ODFM (CL-DFT-S-OFDM) systems and/or other systems providing non-contiguous data transmission with single DFT per carrier, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 that facilitates signal construction and uplink (UL, also referred to herein as reverse link (RL)) transmission in a wireless communication system in accordance with various aspects. As FIG. 1 illustrates, system 100 can include one or more user equipment units (UEs) 110 (also referred to herein as mobile devices or stations, terminals, access terminals (ATs), etc.), which can communicate with one or more base stations 120 (also referred to herein as Node Bs or eNBs, cells or network cells, network nodes, access points (APs), etc.) and/or one or more other entities in system 100.

In accordance with one aspect, UE 110 can engage in one or more UL communications with base station 120, and similarly base station 120 can engage in one or more downlink (DL, also referred to herein as forward link (FL)) communications to UE 110. In one example, UE 110 and base station 120 can employ one or more antennas 118 and 126, respectively, to facilitate communication within system 100. As further shown in system 100, UE 110 and/or base station 120 can utilize respective transceivers 116 and/or any other suitable means for communication within system 100.

In accordance with another aspect, UE 110 and/or base station 120 can utilize Single Carrier FDMA (SC-FDMA) for respective UL and/or DL transmissions. It can be appreciated that SC-FDMA can provide lower peak-to-average power ratio (PAPR) and/or other suitable benefits due to its inherent single carrier structure. Thus, SC-FDMA can in some cases be a beneficial scheme for, e.g., UL transmission where lower PAPR significantly benefits a mobile terminal in terms of transmit power efficiency or the like. In one example, in the event that both data and control signaling are to be transmitted by a device in system 100, the single-carrier structure of a combined control/data transmission can be preserved by multiplexing the control information onto the data.

In addition, UE 110 and/or base station 120 can conduct Physical Uplink Shared Channel (PUSCH) transmissions and/or other communication using two or more clustered assignments, such as, for example, in the case of non-contiguous data transmission with single DFT per component carrier (e.g., CL-DFT-S-OFDM). Accordingly, various aspects as described herein can be applied to various PUSCH resource allocation mechanisms and/or other resource allocation techniques that can be utilized by UE 110, base station 120, and/or a communication system associated therewith (e.g., a system that operates according to LTE, LTE Advanced (LTE-A), etc.). For example, instead of keeping a single-carrier waveform for PUSCH assignments (e.g., contiguous PUSCH assignments within a slot), multi-cluster PUSCH assignments can be utilized, where respective clusters are still contiguous in their respective constituent slots but the respective clusters are not necessarily contiguous themselves. In one example, such a resource allocation, and/or other resource allocation techniques that can be performed in accordance with the various aspects described herein, can be utilized to improve UL efficiency and/or to achieve other suitable ends.

Figure 2:
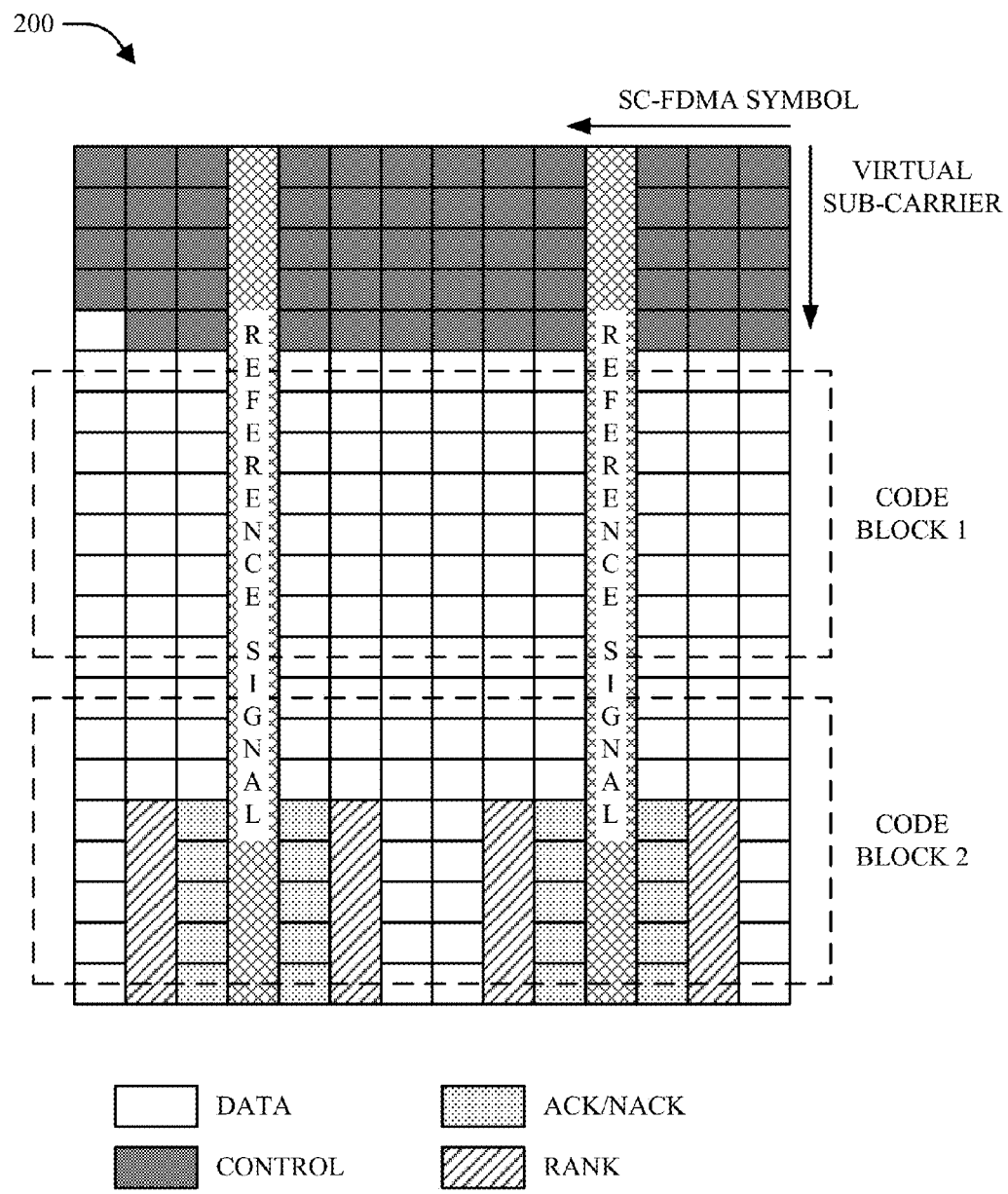
FIG. 2 illustrates an example channel structure that can be utilized for transmission within a wireless communication system in accordance with various aspects.

An example of control/data multiplexing that can be performed in this manner is illustrated by diagram 200 in FIG. 2. As illustrated by diagram 200, when control information, such as, for example, channel quality indicator (CQI) information, precoding matrix indicator (PMI) information, rank indicators (RI), acknowledgement (ACK)/negative acknowledgement (NACK) signaling, scheduling request (SR) signaling, or the like, coexists with a data transmission on a given subframe, the control information can be piggybacked and/or otherwise combined with the data on PUSCH and/or other channels instead of being separately transmitted (e.g., through a Physical Uplink Control Channel (PUCCH)). In the specific example shown by diagram 200, CQI/PMI and RI information can be multiplexed with data, ACK/NACK can be configured to puncture PUSCH resources, and SR can be provided as part of a corresponding media access control (MAC) payload. However, it can be appreciated that diagram 200 is provided merely by way of example and that control information and data can be combined in any suitable manner.

In accordance with one aspect, control information that is modulated with data in the manner shown in diagram 200 and/or in any other suitable manner can in some cases require different relative quality as compared to the data with which it is multiplexed. For example, a tolerable data error rate can be relatively high (e.g., on the order of 10%), while a corresponding tolerable error rate for some types of control information, such as ACK/NACK, can be significantly lower (e.g., on the order of $10^{-3}$). Further, different types of control information (e.g., ACK/NACK, RI, CQI, PMI, etc.) can have different tolerable error rates as compared to each other.

In one example, the varying quality levels required for control information and data with which the control information is multiplexed can be achieved via performing power control in different manners over the resources to which the data and control are respectively mapped (e.g., as shown in diagram 200 or otherwise). Alternatively, a common transmit power can be utilized for control information and data, and the number of coded symbols, resource elements (REs), or the like, that are respectively utilized for control and data can be varied to ensure their respective tolerable signal qualities. By way of specific example, different coding rates for the control information can be achieved by allocating different numbers of coded symbols for their transmission. This can be done by, e.g., utilizing Layer 3 (L3) configured UE-specific offsets, in combination with the number of control information bits, scheduled PUSCH transmission bandwidth, the number of SC-FDMA symbols per subframe, the number of coded PUSCH bits, and/or any other appropriate parameter(s).

It can be appreciated that a coding rate applied to PUSCH transmissions constructed in the above manner can be dynamic in nature, as such transmissions can be scheduled using PDCCH or the like such that the related PDCCH signaling (e.g., provided according to PDCCH format 0, etc.) contains the modulation and coding scheme (MCS) utilized for the PUSCH transmission. Further, it can be appreciated that while the PUSCH transmission is therefore dynamic, the relative quality difference between control information and data within a common PUSCH transmission can be made semi-static by, for example, providing the effective coding rate of control information in a PUSCH transmission in relation to the effective coding rate of the data. Thus, given a PUSCH transmission, the actual number of REs assigned to each channel contained within the transmission can be determined based on a MCS associated with the PUSCH transmission and additional information corresponding to the relative effective coding rate of the control information within the PUSCH transmission in relation to the data within the transmission.

In another example, it can be appreciated that a PUSCH transmission constructed according to diagram 200 and/or any other suitable technique(s) can utilize any suitable modulation order, such as binary phase shift keying (BPSK), quadrature phase shift keying (QPSK), n-th order quadrature amplitude modulation (n-QAM), or the like. However, it can be appreciated that for some types of control information, such as ACK/NACK or the like, it can in some cases be undesirable to utilize a high-order modulation scheme such as n-QAM. Thus, in one example, while some control information such as CQI, PMI, or the like, can utilize the same modulation order as that of PUSCH, modulation constellations for other types of control information, such as ACK/NACK and RI, can be limited such that the Euclidean distance for their respective transmission is maximized.

In a further example, ACK/NACK transmissions can be performed for a time division duplexed (TDD) system utilizing a transmission scheme such as that shown in diagram 200 according to a bundling mode and/or a multiplexing mode. In the bundling mode, a bundled transmission can be achieved by performing a logical AND over subframes in a bundling window for each corresponding codeword. Thus, for example, two DL subframes can be mapped to one UL ACK/NACK transmission such that an ACK is sent if both DL subframes are successfully received and a NACK is sent if either DL subframe is unsuccessfully received. In the multiplexing mode, a multiplexed transmission can be achieved by performing a logical AND over codewords in a given subframe. Thus, for example, two DL codewords can be mapped to one UL ACK/NACK transmission such that an ACK is sent if information is successfully received for both codewords or a NACK is sent if information is not successfully received on at least one of the codewords.

It can be appreciated that various techniques as described above for combining control information and data into a common transmission can be utilized in the context of a rank-1 transmission, such as that associated with a single-input-single-output (SISO) or single-input-multiple-output (SIMO) system. However, in the event that a network device is capable of leveraging a transmit rank of greater than 1, such as that in the case of multiple-input-multiple-output (MIMO) UL communication (e.g., as shown in system 100), the above techniques become difficult to implement due to the multiple layers utilized by MIMO transmission. As used herein, the term "layers" can refer and correspond to spatial layers (e.g., corresponding to respective antennas, beams and/or other formed as respective combinations of multiple antennas, etc.), codewords, and/or any other suitable structure(s). Further, unless explicitly stated otherwise, it is to be appreciated that the claimed subject matter is not intended to be limited to any single such interpretation or set of interpretations.

In accordance with one aspect, UE 110 in system 100 can utilize various techniques for facilitating combined transmission of control information and data over multiple layers. For example, as shown in system 100, UE 110 can identify control information to be transmitted to one or more network entities, such as a base station 120, via a control information source 112 and/or other suitable mechanisms. Further, UE 110 can include a layer mapping module 114 that can obtain information relating to a set of layers (e.g., spatial layers, codewords, etc.) designated for UL MIMO transmission and select respective layers from the set of layers on which to schedule UL MIMO transmission of at least a portion of the control information. Upon successful scheduling, the control information can be transmitted (e.g., along with data) via a transceiver 116. Subsequently, at base station 120, a transceiver 116 and/or another mechanism can identify a transmission provided by a network device, such as UE 110, over a plurality of layers. Base station 120 can then utilize a layer identification module 122 and/or other suitable means to determine respective layers corresponding to the transmission to which control information is mapped, based on which transceiver 116 and/or a control processing module 124 can receive at least a portion of the control information on respective layers to which the control information is determined to be mapped. Upon successful receipt of control information, the control information can be processed by control processing module 124 and/or other means.

Figure 3:
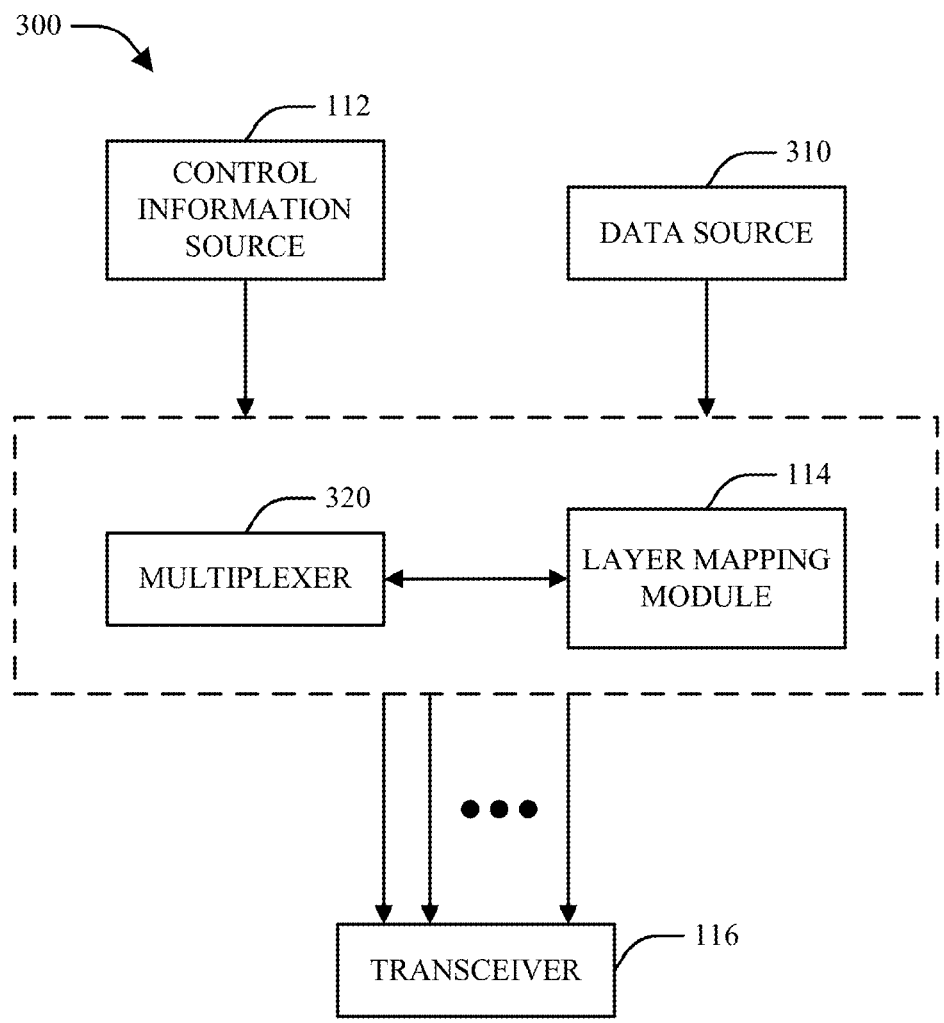
FIG. 3 is a block diagram of a system that facilitates control and data multiplexing for uplink MIMO communication in accordance with various aspects.

Turning now to FIG. 3, a system 300 that facilitates control and data multiplexing for UL MIMO communication in accordance with various aspects is illustrated. As shown in FIG. 3, system 300 can include a control information source 112 and a data source 310, and/or any other suitable source(s) of control signaling and/or data, respectively, to be transmitted by an entity associated with system 300. Respective information provided by control information source 112 and data source 310 can be provided to a multiplexer 320 and/or a layer mapping module 114. In one example, information provided by control information source 112 and/or data source 310 can be combined by multiplexer 320 and/or other suitable means, and/or mapped to one or more layers via layer mapping module 114 prior to transmission via a transceiver 116. In one example, operation of multiplexer 320 and layer mapping module 114 can be performed in any suitable order. Thus, for example, information from data source 310 and control information source 112 can initially be provided to multiplexer 320 such that the multiplexed information is provided to layer mapping module 114, or alternatively information from control information source 112 and data source 310 can initially be provided to layer mapping module 114 such that multiplexing can be performed by multiplexer 320 on a per-layer basis.

In one example, system 300 can be utilized in the context of an UL MIMO transmission scheme; thus, multiplexer 320 and/or layer mapping module 114 can be utilized to facilitate a single-carrier transmission, a multi-cluster transmission, and/or any other suitable transmission of control information and data spanning multiple spatial layers, codewords, and/or other suitable layers. In accordance with one aspect, various techniques as described herein, such as those usable by system 300, can adapt existing techniques for control/data multiplexing in the context of rank-1 transmission to the case of a MIMO transmission. Thus, for example, various techniques as provided herein can utilize various aspects of transmission waveform design, such as offset-based effective coding rates, modulation order design, rate matching and/or puncturing, or the like, in a novel manner to facilitate generation of single-carrier waveforms, multi-cluster waveforms, or the like for UL MIMO transmission. For example, various aspects as provided herein can be utilized to facilitate PUSCH-only transmissions wherein control information is piggybacked onto corresponding data, PUCCH+PUSCH parallel transmissions wherein parallel transmissions of control and data are conducted, and/or other suitable transmission types.

As used generally herein, the number of transmission layers utilized for PUSCH is denoted by L (e.g., where L≥1). While various aspects herein are directed to the case of L≥1 (e.g., corresponding to a MIMO transmission), it can be appreciated that various aspects as described herein can be utilized in combination with, or in lieu of, various techniques as generally known in the art for facilitating generation of transmission waveforms for any suitable value of L. As further used herein, scheduling request (SR) signaling can be included as part of a corresponding MAC protocol data unit (PDU) such that multiplexing of SR and PUSCH need not be performed. It should be appreciated, however, that SR signaling, as well as any other signaling type(s), whether or not explicitly stated herein, could be multiplexed and/or otherwise provided within a communication in accordance with the various aspects provided herein. Further, unless explicitly stated otherwise, it is to be appreciated that the claimed subject matter is not intended to be limited to any specific use case(s) and/or signaling type(s).

As further used herein, the L layers utilized by an associated communication system are referred to as $l_n$, where n= 1, ..., L. Further, by way of specific example, the layer(s) used to carry CQI are denoted by $l_{CQI}$, the layer(s) used to carry RI are denoted by $l_{RI}$, and the layer(s) used to carry ACK/NACK are denoted by $l_{AN}$. Further, as noted above, it should be appreciated that the term "layers" as used herein can correspond to codewords as well as spatial layers. Thus, by way of example, if a transmission scheme utilizes four spatial layers and only two codewords, each codeword can be configured to map to two spatial layers. Accordingly, the respective techniques herein can operate in such an example based on a system of two effective layers corresponding to the respective codewords, each of which map to two spatial layers. Alternatively, the respective techniques herein can operate based on the four provided spatial layers.

Figure 4:
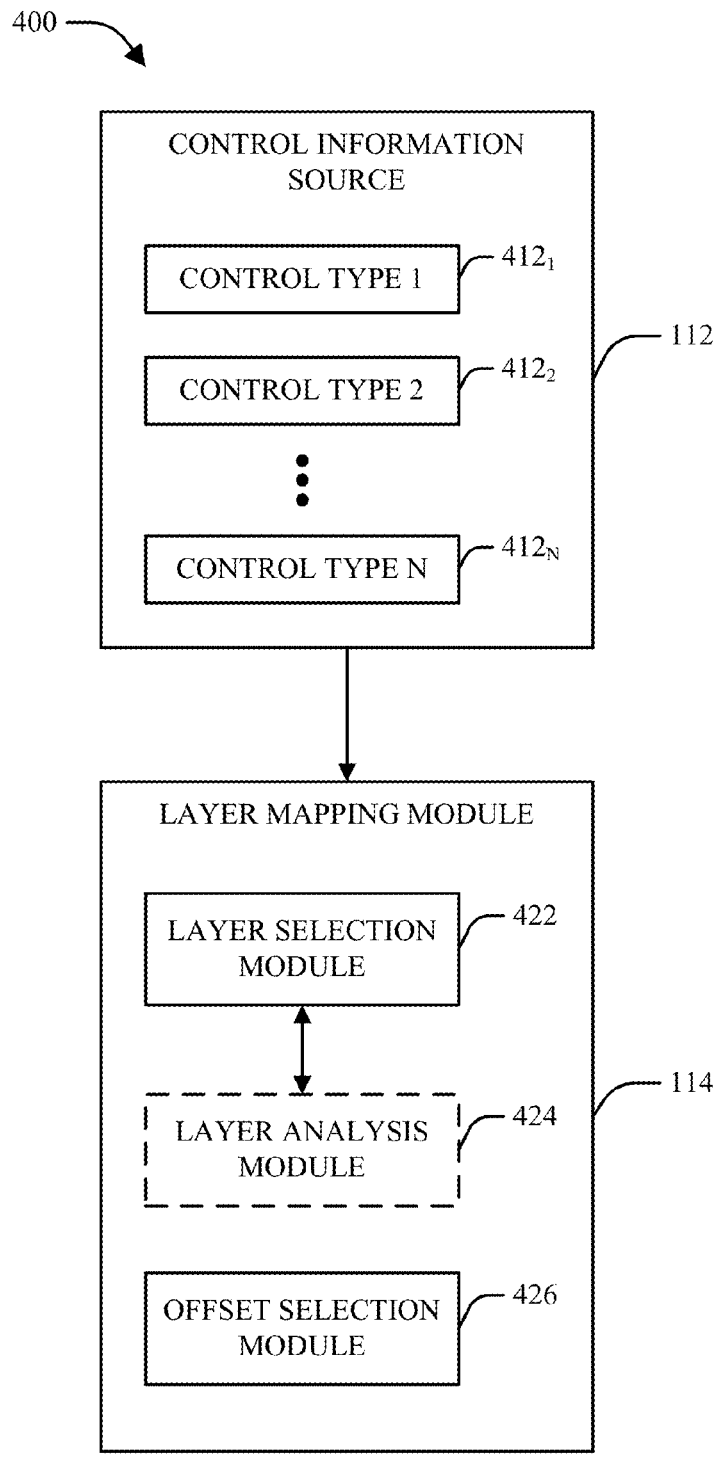
FIG. 4 is a block diagram of a system that facilitates layer selection and mapping for respective control information to be transmitted within a wireless communication system in accordance with various aspects.

Turning next to FIG. 4, a system 400 that facilitates layer selection and mapping for respective control information to be transmitted within a wireless communication system in accordance with various aspects is illustrated. System 400 can include a control information source, which can generate and/or otherwise identify control information of one or more control types 412. Additionally, system 400 can include a layer mapping module 114 that maps control information to respective layers for UL MIMO transmission.

As noted above, the number of layers carrying one or more types of control information need not be limited by one in a MIMO transmission, as the number of layers utilized for PUSCH can be larger than 1. Thus, for example, $|l_{CQI}|\geq 1$ can be utilized in some cases, and similar observations can be made for RI, ACK/NACK, and/or any other control types 412. Thus, in accordance with one aspect, control information can be encoded and mapped by layer mapping module 114 to one or multiple layers, thereby providing a tradeoff between the reliability of control information transfer and the impact on PUSCH performance across multiple layers.

By way of example utilizing CQI, the following two scenarios can be considered. First, a scenario can be considered where $|l_{CQI}|=1$ and $\beta_{offset}^{CQI}=X_1$, where $\beta_{offset}^{CQI}$ is an offset determining the number of symbols for CQI transmission. Second, a scenario can be considered where $|l_{CQI}|=L$ and $\beta_{offset}^{CQI}=X_2$, where $\beta_{offset}^{CQI}$ is the offset determining the number of symbols for CQI transmission per layer. Based on these two scenarios, in order to achieve the same or similar target performance at an associated base station and/or other entities, $X_1$ and $X_2$ can be set such that $X_2 \leq X_1$ due to the enabling of multi-layer transmission of the same CQI information. This can imply that while utilizing the first of the above scenarios, the transmission of CQI has an impact on one and only one layer (e.g., such that the impact across layers is non-uniform), while the transmission of CQI in the second scenario has a uniform impact on all layers. Further, it can be appreciated that in the second scenario, the impact per layer is less than that of the specific layer in the first scenario due to the smaller control offset per layer.

Thus, given the above analysis, layer mapping module can map respective control information to one or more layers associated with system 400 in a variety of manners. In accordance with one aspect, a layer selection module 422 can select one or more layers from a set of layers associated with system 400 to utilize for mapping control information from control information source 112. Layer selection module 422 can operate independently and/or with the cooperation of an optional layer analysis module 424 that analyzes respective layers in the associated set of layers. In another aspect, upon selection of one or more layers to utilize for control information, an offset selection module 426 can be utilized to select and apply respective offsets to control information scheduled for transmission on respective layers in an associated set of layers. Various specific, non-limiting examples by which layer mapping module 114 and its respective components can operate are described in further detail below.

In a first example, layer mapping module 114, via layer selection module 422, can select substantially all layers in an associated set of layers on which to schedule uplink MIMO transmission of at least a portion of the control information provided by control information source 112. Thus, in the example of CQI, RI, and ACK/NACK signaling, the layers utilized to schedule such information can be expressed as $|l_{CQI}|=|l_{RI}|=|l_{AN}|=L$. In another example, layer-dependent layer 3 (L3) configuration can be utilized for offsets applied to CQI, RI, and ACK/NACK signaling, which can be respectively expressed as $\beta_{offset}^{CQI}$, $\beta_{offset}^{RI}$, and $\beta_{offset}^{AN}$. Thus, the respective offsets can be configured as $\beta_{offset,L}^{CQI}$, $\beta_{offset,L}^{RI}$, and $\beta_{offset,L}^{AN}$, where, e.g., $\beta_{offset,L1}^{CQI} \leq \beta_{offset,L2}^{CQI}$ if $L_1 \geq L_2$. As noted above, the term "layers" as used herein can apply to spatial layers or codewords. Accordingly, it can be appreciated that the above examples can be extended to the case where offsets are configurable for control information on a per-codeword basis.

In a second example, layer mapping module 114, via layer selection module 422, can select a subset of less than all layers in an associated set of layers on which to schedule uplink MIMO transmission of at least a portion of control information provided by control information source 112. A subset of layers as selected by layer selection module 422 can include, e.g., one layer or any number of layers that is less than the total number of layers associated with system 400.

Thus, for example, layer mapping module 114 can be utilized to restrict transmission of control information to a per-layer basis wherein, e.g., $||_{CQI}|=||_{RI}|=||_{AN}|=1$. In such a case, layer selection module 422 can in some cases facilitate transmission of CQI, RI, ACK/NACK, and/or other control types 412 on different layers, such that, for example, $1_{CQI} \neq 1_{RI} \neq 1_{AN}$ if such a mapping is possible. By mapping control information to respective layers in this manner, it can be appreciated that the impact of combining the control information with data to be transmitted by an associated network device can be distributed over different layers to the extent possible.

If such a control mapping technique is utilized, layer selection module 422, independently of and/or with the aid of a layer analysis module 424, can determine respective layers to utilize for scheduling control information in various manners. For example, the modulation order and/or coding rate of different layers can be used to decide on a control-to-layer mapping. Thus, layer mapping module 114 and/or other means can be utilized to identify quality threshold(s) associated with control information associated with control information source 112 and respective quality levels achievable by respective layers in an associated set of layers, and layer selection module 422 can select one or more layers from a set of associated layers according to the quality threshold(s) associated with the control information and the respective quality levels achievable by the respective layers.

Further, the relative priorities of control types 412 provided by control information source 112 can be taken into account in determining one or more layers to which control information provided by control information source 112 is to be mapped. Thus, in the event that, e.g., ACK/NACK and RI are given higher priority than CQI and/or PMI, ACK/NACK and RI can be given priority over CQI and PMI for mapping on layers that offer higher levels of transmission protection (e.g., low coding rates, low modulation orders, etc.).

As an alternative mapping strategy to the above, layer mapping module 114 can facilitate transmission of CQI, RI, ACK/NACK, and/or other suitable control types 412 on one or more candidate layers, which can be selected based on various factors. For example, layer mapping module 114 can identify a candidate subset of layers from among an associated set of layers and select one or more layers in the candidate subset of layers on which to schedule UL MIMO transmission of at least a portion of control information provided by control information source 112.

In one example, the candidate subset of layers can include respective layers in the set of associated layers that are determined to have lowest code rates, modulation orders, or the like, among the layers in the set of associated layers. It can be appreciated that layer selection and mapping can be performed in this manner due to the fact that, e.g., PUSCH is less sensitive to rate matching and puncturing of DL control information (DCI) format with lower code rates and/or modulation orders. Additionally or alternatively, as stated above, utilizing one or more layers with low modulation orders and/or code rates for transmission of control information can in some cases yield higher protection of the control information against transmission errors or the like.

In an alternative example, the candidate subset of layers can include respective layers in the set of associated layers that are determined to have highest code rates, modulation orders, or the like, among the layers in the set of associated layers. In one example, such an example can be utilized in the case of UL antenna imbalance. For example, in the case that a network device has multiple antennas of varying gains and each antenna is associated with one or more distinct layers, it can be appreciated that the antenna(s) having higher gains can be associated with a relatively higher MCS than the antenna(s) having lower gain. Thus, to minimize impact on PUSCH and/or other aspects of UL transmission, control information can be mapped to the antenna(s) and/or corresponding channel(s) having the highest relative quality and/or corresponding MCS. Further, by mapping control information to high-MCS layers in this manner, it can be appreciated that the number of resource elements (REs) needed to achieve a given quality target for the control information and corresponding data can be less than that associated with low-MCS layers, thereby enabling reduced overhead for control transmission in some cases.

In another aspect, multi-layer transmission per control type can be facilitated by layer mapping module 414, wherein, e.g., $1 \leq ||_{CQI}| \leq L$, $1 \leq ||_{RI}| \leq L$, and $1 \leq ||_{AN}| \leq L$. In such an example, the spanned number of layers can be configured differently for respective control types 412 (e.g., CQI, RI, ACK/NACK, etc.). In one example, layer mapping module 114, layer selection module 422, or the like can map control information to layers in the above manner such that the impact on PUSCH performance and/or other suitable performance metrics are minimized to the extent possible while providing sufficient quality for the corresponding control information.

As described in various examples above, respective offsets can be applied to control information that is mapped to respective layers by utilizing an offset selection module 426 and/or other suitable means associated with layer mapping module 114. In one example, a layer-independent offset can be applied to at least a portion of control information scheduled for transmission on respective layers in a set of layers associated with system 400. Additionally or alternatively, layer-dependent, codeword-dependent, and/or otherwise variable offsets can be applied to at least a portion of control information scheduled for transmission on respective layers in a set of associated layers. In one example, variable offsets between respective layers can be given as a function of the respective layers. For example, values can be determined for respective variable offsets based on at least one of properties (e.g., modulation order, coding rate, etc.) of respective layers on which transmission of control information is scheduled or a number of layers on which transmission of control information is scheduled.

With reference again to FIG. 1, upon receiving an UL MIMO transmission as constructed in accordance with one or more techniques as described above with respect to system 400, base station 120 can utilize a layer identification module 122 and/or other suitable means to identify respective layers to which control information has been mapped, based on which a control processing module 124 and/or other suitable mechanisms can process the identified control information. By way of specific example, layer identification module 122 can determine a first set of layers corresponding to a transmission from UE 110 to which a first type of control information is mapped, a second set of layers corresponding to the transmission from UE 110 to which a second type of control information, disparate from the first type of control information, is mapped, and so on.

Further, in the case that offsets are applied to layer-mapped control information by UE 110, layer identification module 122 and/or other components of base station 120 can be utilized to identify offsets applied to the control information on the respective layers to which the control information is mapped in order to enable receipt of at least a portion of the control information according to the offsets applied thereto. In one example, offsets identified by base station 120 can be layer-independent offsets applied to control information mapped to respective layers corresponding to a transmission, respective per-layer offsets applied to control information mapped to respective layers corresponding to a transmission, and/or any other suitable offset(s). In another example, base station 120 can determine respective per-layer offsets applied to control information as a function of at least one of properties of the layers to which the control information is mapped or a number of layers to which the control information is mapped.

Figure 5:
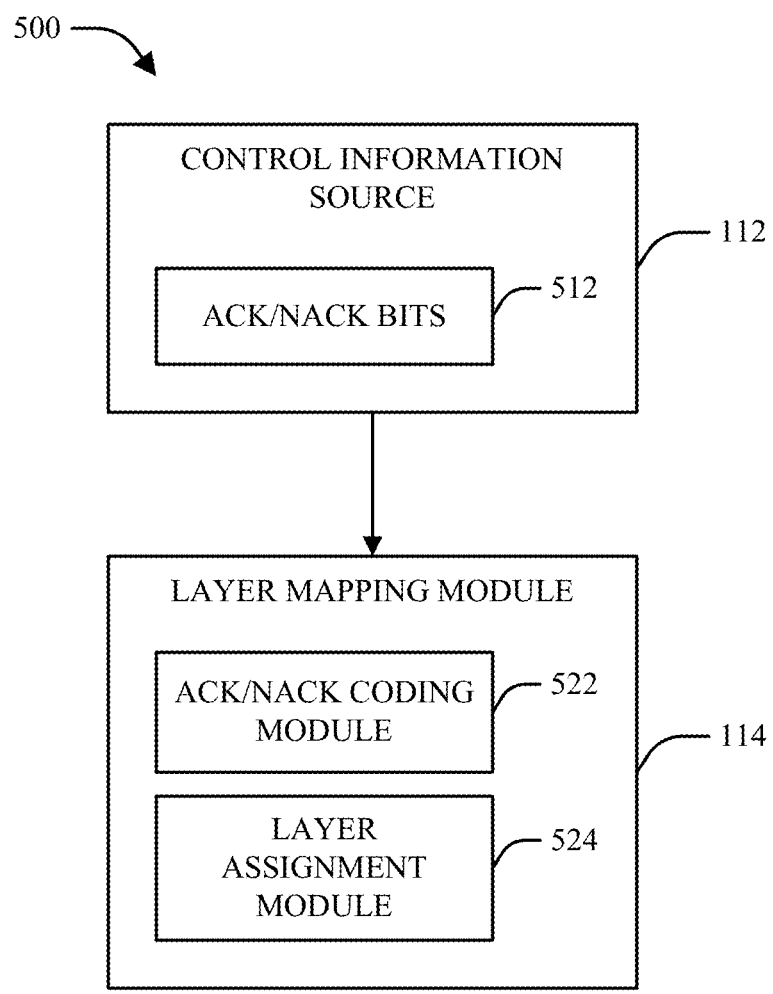
FIG. 5 is a block diagram of a system that facilitates coding and layer mapping for acknowledgement (ACK)/negative acknowledgement (NACK) information in accordance with various aspects.

Referring next to FIG. 5, a block diagram of a system 500 that facilitates coding and layer mapping for ACK/NACK information in accordance with various aspects is illustrated. In accordance with one aspect, it can be appreciated that the existence of multiple layers on the UL can provide opportunity for redesigning of TDD ACK/NACK bundling and/or multiplexing mode operation. Accordingly, system 500 can include a control information source 112 that provides one or more ACK/NACK bits 512 to a layer mapping module 114, which can leverage an ACK/NACK coding module 522 and/or a layer assignment module 524 as described in further detail herein. While the following discussion focuses on multiplexing mode for TDD ACK/NACK communication, it should be appreciated that similar techniques to those illustrated and described herein can be applied to bundling mode. Further, similar techniques to those described herein can be utilized for FDD ACK/NACK communication over, e.g., different DL/UL carriers or subcarriers, and/or any system that generally utilizes TDD and/or FDD for DL/UL communication and corresponding ACK/NACK signaling in any suitable manner. For example, the techniques described herein can be utilized in the context of a system in which ACK/NACK transmission is conducted in one UL subframe for multiple DL subframes, multiple DL carriers, or a combination thereof.

In existing wireless network implementations, various TDD DL/UL configurations can be utilized that correspond to different ratios of DL subframes and UL subframes. By way of specific, non-limiting example, LTE TDD configuration #5 comprises 9 DL subframes per 1 UL subframe. Accordingly, in the case that such a configuration is utilized, ACK/NACK feedback corresponding to 9 DL subframes would be required at each UL subframe. However, due to the difficulty in providing sufficient quality for ACK/NACK information, such an ACK/NACK configuration is generally not supported by existing systems. More particularly, the number of ACK/NACK bits M supportable by a communication system is generally upper limited by a relatively small number (e.g., 4) to ensure a satisfactory tradeoff between capacity and quality, thereby rendering configurations such as TDD DL/UL configuration #5 unsupported.

Accordingly, layer mapping module 114 can leverage a multi-layer (e.g., MIMO) transmission scheme utilized by a device associated with system 500 to facilitate UL ACK/NACK transmission for a larger number of corresponding DL subframes. For example, if control information provided by control information source 112 comprises one or more ACK/NACK bits corresponding to one or more DL transmission over at least one of different subframes or different carriers and UL channel quality associated with system 500 is sufficiently high to enable multi-layer transmission, layer mapping module 114 can operate in various manners as described herein to facilitate improved ACK/NACK communication in terms of bit capacity, reliability, and/or other metrics.

In a first example, one or more ACK/NACK bits 512 can be jointly coded (e.g., by an ACK/NACK coding module 522) and one or more layers can be selected from a set of associated layers (e.g., via layer assignment module 524) on which to schedule UL MIMO transmission of the one or more ACK/NACK bits 512 as generally discussed above. Additionally or alternatively, layer assignment module 524 can split the one or more ACK/NACK bits 512 into a plurality of groups and select a plurality of layers from a set of associated layers on which to schedule UL MIMO transmission of respective groups of the ACK/NACK bits 512. For example, a set of M ACK/NACK bits 512 can be split into 2≤L'≤L layers, such that:

$$\sum_{l=1}^{L'} M_l \geq M,$$

where $M_l$ is the number of bits carried by the l-th layer in the set of L' layers that correspond to one or more ACK/NACKs for respectively associated DL subframes. In one example, the selection of L' layers and the actual division of the M ACK/NACK bits 512 as indicated above can depend on factors such as the ones listed above, and can further depend on additional factors such as the TDD DL/UL configuration, the actual number of DL transmissions in the subframe bundling window, the number of codewords, etc.

In another example, upon receipt of an UL ACK/NACK transmission as constructed as generally described above, a base station (e.g., base station 120) can determine one or more layers to which respectively corresponding ACK/NACK bits 512 are mapped, based on which the base station can process the ACK/NACK bits 512 appropriately.

Figure 6:
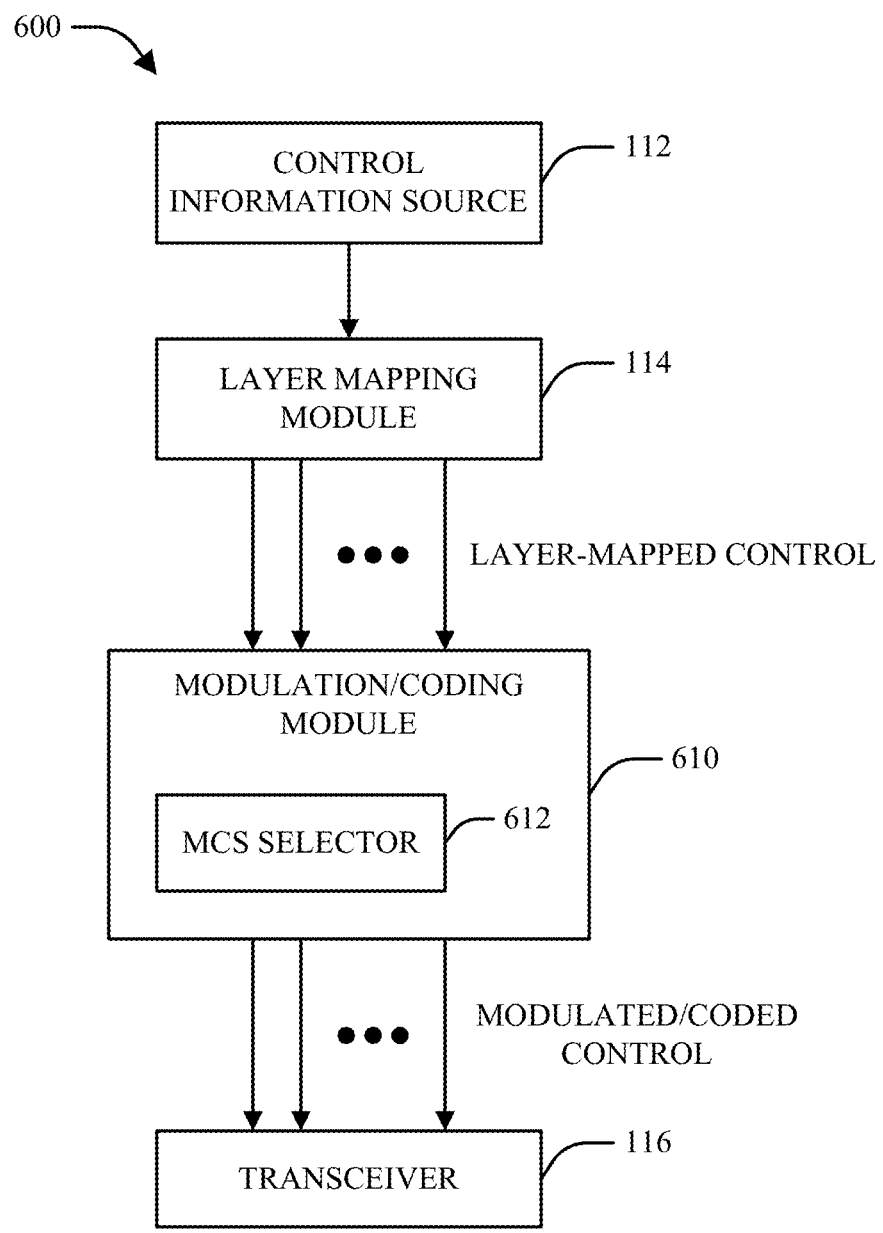
FIG. 6 is a block diagram of a system that facilitates modulation and coding scheme (MCS) selection and application for control information within a wireless communication system in accordance with various aspects.

Turning to FIG. 6, a system 600 that facilitates MCS selection and application for control information within a wireless communication system in accordance with various aspects is illustrated. As FIG. 6 illustrates, system 600 can include a control information source 112, a layer mapping module 114, and a transceiver 116, which can operate in various manners as generally described above. Additionally, system 600 can include a modulation/coding module 610, which can determine (e.g., via a MCS selector 612) a MCS for transmission of at least a portion of control information provided by control information source on one or more layers respectively selected for the control information by layer mapping module 114 as generally described herein. Subsequently, at a receiving base station (e.g., base station 120), a MCS applied to at least a portion of control information provided in an UL communication can be identified as additionally described herein.

In accordance with one aspect, data (e.g., PUSCH data) and various control fields (e.g., ACK/NACK, CQI/PMI, etc.) can be mapped to separate modulation symbols such that, e.g., a single symbol (e.g., QPSK, 16-QAM, 64-QAM, etc.)

cannot contain both data and control. Accordingly, MCS selector 612 and/or modulation/coding module 610 can apply modulation and/or coding for control information based on various criteria.

In a first specific, non-limiting example, control information processed by system 600 can include channel quality information (e.g., CQI, PMI, etc.), and MCS selector 612 can select a MCS for transmission of at least a portion of the channel quality information that is associated with data to be transmitted with the channel quality information. Thus, for example, CQI/PMI and/or other control information can utilize the same modulation order and/or the same coding scheme (e.g., Reed-Muller (RM) coding, tail-biting convolutional code (TBCC), etc.). Subsequently, at a receiving base station (e.g., base station 120), a common MCS utilized within a transmission for channel quality information and data can be identified and utilized to process the channel quality information. In an alternative example, CQI/PMI can be provided within a multiplexed UL transmission via puncturing of corresponding data in some cases (e.g., scenarios where an associated UL signal quality is above a predetermined threshold, etc.). In a further example, CQI/PMI can be provided via rate matching and/or in any other suitable manner.

In a second, specific, non-limiting example, control information processed by system 600 can include at least one of ACK/NACK information or rank information. In such an example, a constellation for ACK/NACK and RI can be restricted to BPSK (e.g., 1-bit ACK and/or RI) or QPSK (e.g., 2-bit ACK and/or RI), and coding and scrambling can be performed such that the Euclidean distance of the modulation symbols carrying ACK/NACK and/or RI is maximized. Thus, by way of example, MCS selector 612 and/or other means associated with modulation/coding module 610 can select a modulation scheme for ACK/NACK information and rank information from the group consisting of BPSK and QPSK and perform coding and scrambling for the ACK/NACK information and the rank information such that Euclidian distances between modulation constellations associated with the ACK/NACK information and the rank information are substantially maximized. Subsequently, at a receiving base station (e.g., base station 120), modulation constellations associated with ACK/NACK information and rank information can be identified that are constructed via modulation/coding module 610 based on BPSK or QPSK and associated coding and scrambling such that Euclidian distances between a modulation constellation associated with the ACK/NACK information and a modulation constellation associated with the rank information is substantially maximized.

In an alternate specific example, when the number of ACK/NACK bits is larger than 2 (e.g., to support multiple codewords, multiple DL hybrid automatic repeat request (HARD) processes in TDD, multi-carrier operation in FDD, etc.), modulation/coding module 610 and/or MCS selector 612 can determine a MCS to be utilized for control information in various manners. For example, ACK/NACK can utilize a coding scheme utilized for channel quality information (e.g., a (20, m) code utilized for CQI and/or PMI, etc.), a unique (n, k) coding scheme (e.g., a (7, 3) coding scheme and/or any other suitable scheme), and/or QPSK modulation without parity coding. More particularly, in various wireless network implementations ACK bits ($o_0^{ACK}$ and $o_1^{ACK}$) are provided with parity coding, e.g., ($o_2^{ACK} = ((o_0^{ACK} + o_1^{ACK}) \mod 2)$, such that three bits are transmitted using QPSK. Accordingly, the parity bit $o_2^{ACK}$ can be removed to enable transmission of an additional ACK/NACK bit. In such an example, scrambling and coding can additionally be performed such that the Euclidean distance is maximized. In a further example, a combination of one or more of the above options, as well as any other suitable option(s), can be utilized.

Similarly, when the number of RI bits is 3 (e.g., in order to support up to 8 layers), the coding of RI can be performed by modulation/coding module 610 by, for example, utilizing a coding scheme utilized for channel quality information, utilizing a unique coding scheme for RI, leveraging QPSK modulation without parity coding, and/or performing any other suitable action(s) as generally described above in the context of ACK/NACK information.

Thus, in accordance with one aspect, MCS selector 612 and/or other means associated with modulation/coding module 610 can select an MCS for control information including at least one of ACK/NACK information or rank information by performing at least one of selecting a MCS associated with channel quality information or precoding information for transmission of at least a portion of ACK/NACK information or rank information, coding at least one of ACK/NACK information or rank information according to a (n, k) coding scheme for predetermined values of n and k, or modulating at least one of ACK/NACK information or rank information according to QPSK such that a parity bit provided via an associated QPSK constellation is utilized to carry additional ACK/NACK information or rank information.

Referring now to FIGS. 7-11, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
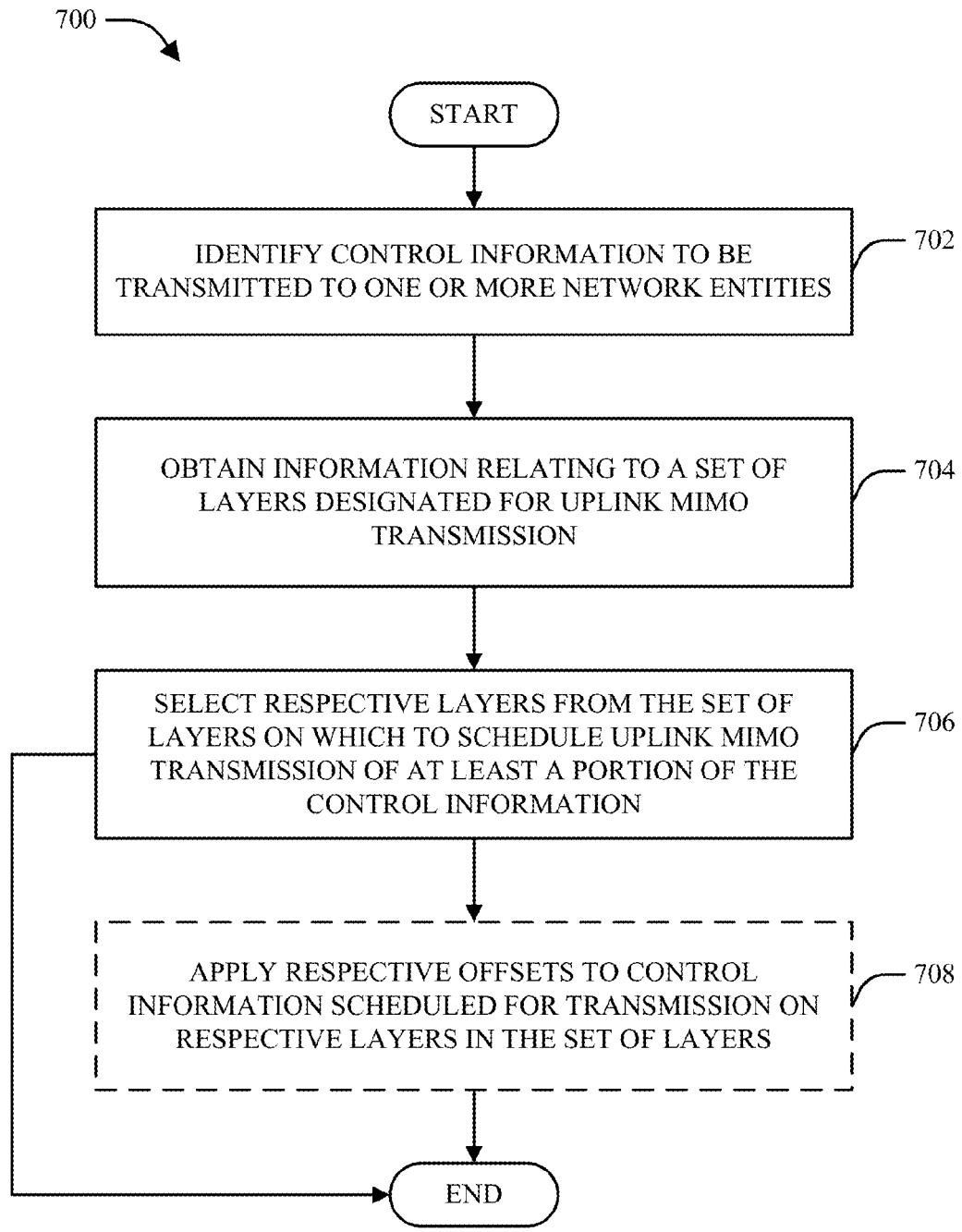
FIG. 7 is a flow diagram of a methodology that facilitates mapping control information to one or more layers associated with a wireless communication system.

With reference to FIG. 7, illustrated is a methodology 700 that facilitates mapping control information to one or more layers associated with a wireless communication system. It is to be appreciated that methodology 700 can be performed by, for example, a mobile device (e.g., UE 110) and/or any other appropriate network entity. Methodology 700 begins at block 702, wherein control information to be transmitted to one or more network entities (e.g., base station 120) is identified (e.g., via a control information source 112). At block 704, information relating to a set of layers designated for UL MIMO transmission is obtained. Next, at block 706, respective layers are selected (e.g., via a layer mapping module 114) from the set of layers identified at block 704 on which to schedule UL MIMO transmission of at least a portion of the control information identified at block 702.

Upon completion of the acts described at block 706, methodology 700 can conclude. Alternatively, methodology 700 can optionally proceed to block 708 prior to concluding, wherein respective offsets are applied (e.g., via an offset selection module 426) to control information scheduled for transmission on respective layers in the set of layers (e.g., by a layer selection module 422 at layer mapping module 114).

Figure 8:
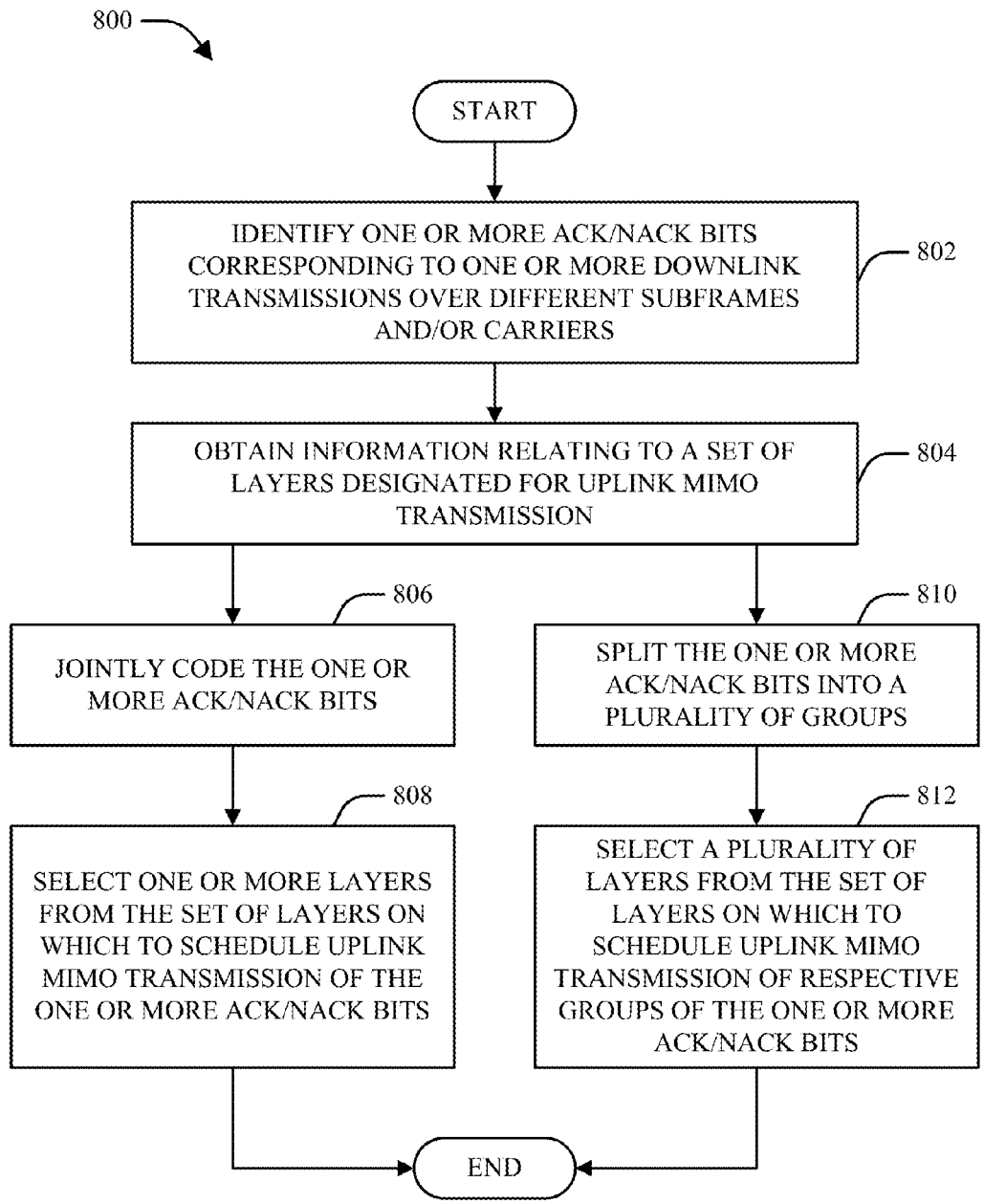
FIG. 8 is a flow diagram of a methodology for preparing a transmission of ACK/NACK bits for transmission.

Turning now to FIG. 8, a flow diagram of a methodology 800 for preparing a transmission of ACK/NACK bits (e.g., ACK/NACK bits 512) for transmission is illustrated. Methodology 800 can be performed by, for example, a UE and/or any other appropriate network entity. Methodology 800 begins at block 802, wherein one or more ACK/NACK bits corresponding to one or more DL transmissions over different subframes and/or carriers are identified. Next, at block 804, information is obtained that relates to a set of layers designated for UL MIMO transmission.

Upon completion of the acts described at block 804, methodology 800 can perform the acts described at blocks 806-808 and/or blocks 810-812 prior to concluding. At block 806, the one or more ACK/NACK bits identified at block 802 are jointly coded (e.g., via an ACK/NACK coding module 522). At block 808, one or more layers are selected (e.g., via a layer assignment module 524) from the set of layers identified at block 804 on which to schedule UL MIMO transmission of the one or more ACK/NACK bits. Alternatively, at block 810, the one or more ACK/NACK bits identified at block 802 are split into a plurality of groups. Subsequently, at block 812, a plurality of layers is selected (e.g., via a layer assignment module 524) from the set of layers identified at block 804 on which to schedule UL MIMO transmission of respective groups of the one or more ACK/NACK bits as generated at block 810.

Figure 9:
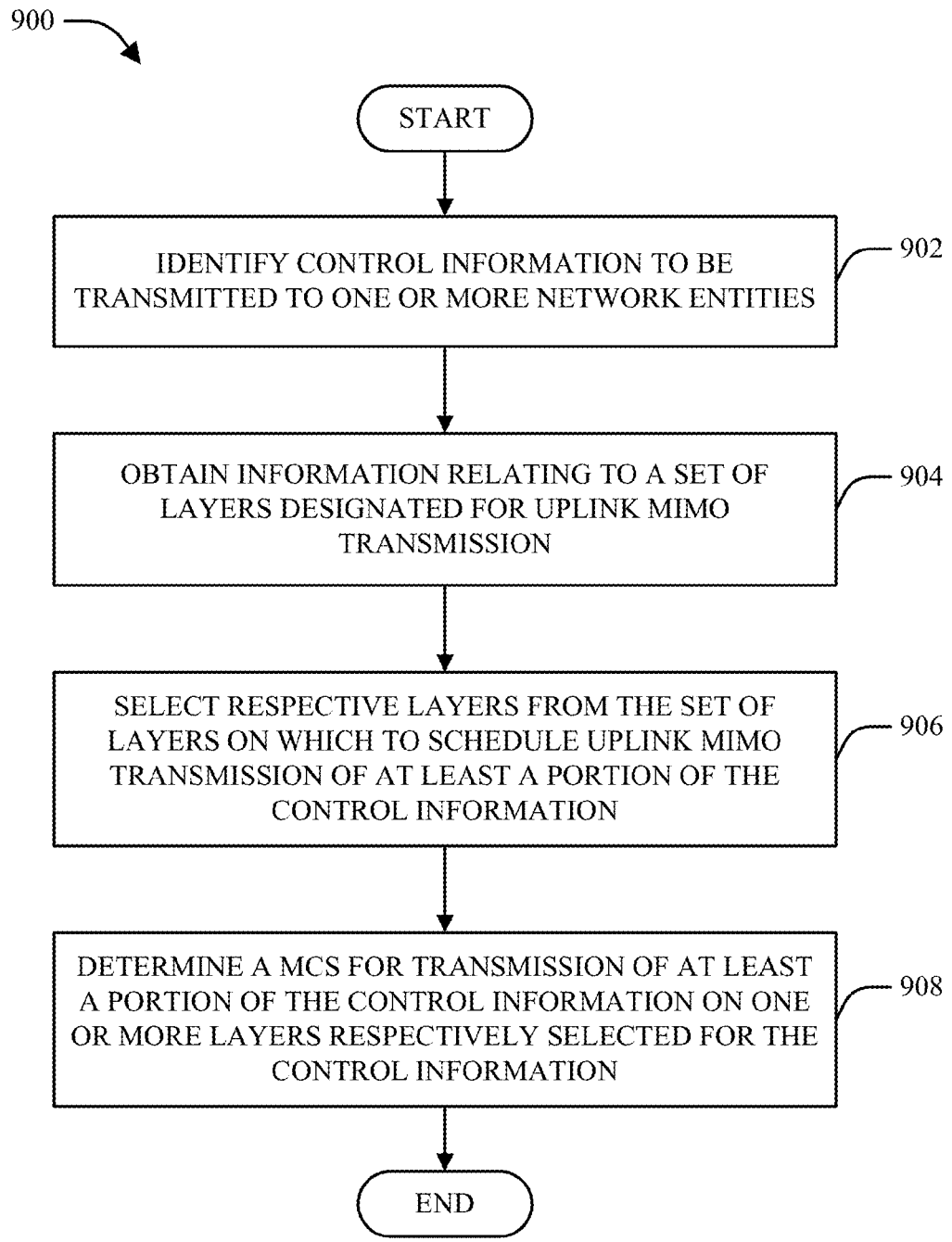
FIG. 9 is a flow diagram of a methodology that facilitates layer mapping, modulation, and coding for information to be transmitted in a MIMO communication system.

FIG. 9 illustrates a methodology 900 that facilitates layer mapping, modulation, and coding for information to be transmitted in a MIMO communication system. Methodology 900 can be performed by, for example, a mobile terminal device and/or any other suitable network entity. Methodology 900 begins at block 902, wherein control information to be transmitted to one or more network entities is identified. Next, at block 904, information relating to a set of layers designated for UL MIMO transmission is obtained. At block 906, respective layers are selected from the set of layers identified at block 904 on which to schedule UL MIMO transmission of at least a portion of the control information identified at block 902. Methodology 900 can then conclude at block 908, wherein a MCS is determined (e.g., via a modulation/coding module 610) for transmission of at least a portion of the control information identified at block 902 on one or more layers respectively selected for the control information at block 906.

Figure 10:
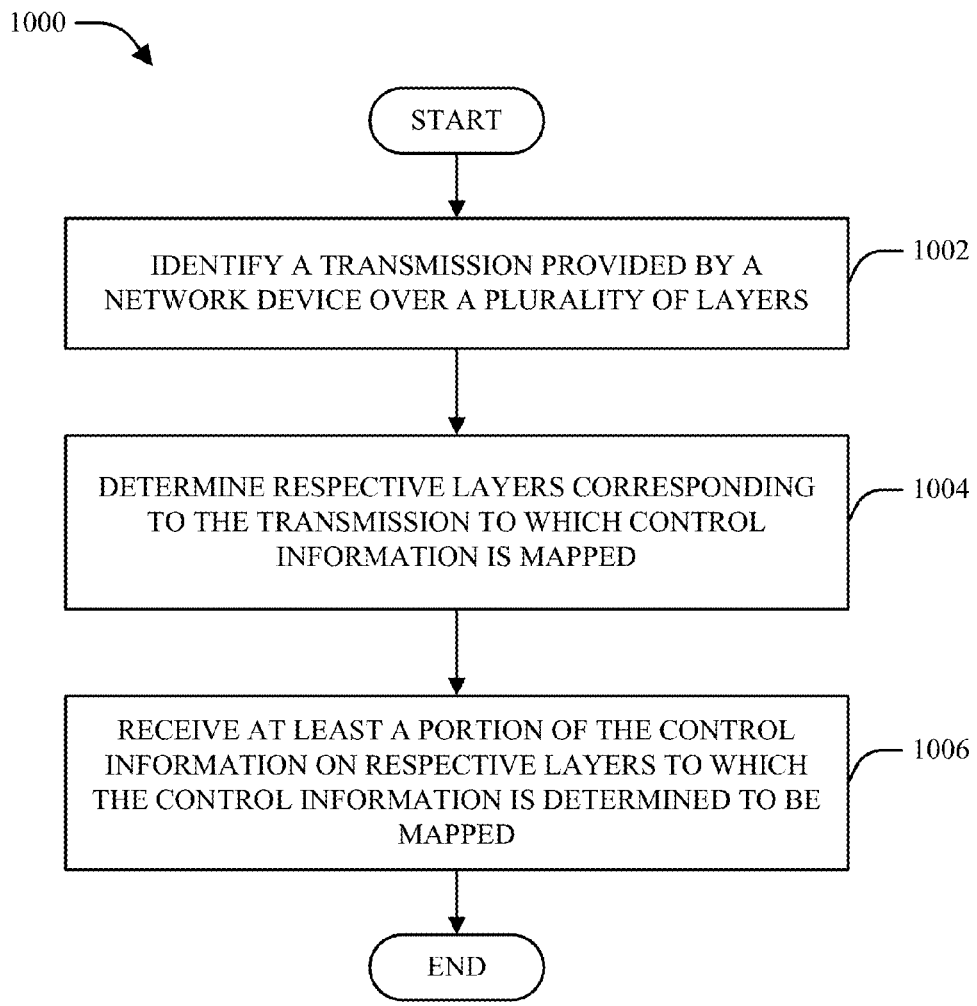
FIGS. 10-11 are flow diagrams of respective methodologies for processing a multi-layer transmission received within a wireless communication environment.

Turning next to FIG. 10, a first methodology 1000 for processing a multi-layer transmission received within a wireless communication environment is illustrated. It is to be appreciated that methodology 1000 can be performed by, for example, a base station (e.g., base station 120) and/or any other appropriate network entity. Methodology 1000 begins at block 1002, wherein a transmission provided by a network device (e.g., UE 110) over a plurality of layers is identified (e.g., via a transceiver 116). At block 1004, respective layers corresponding to the transmission identified at block 1002 to which control information is mapped are identified (e.g., via a layer identification module 122). Methodology 1000 can then conclude at block 1006, wherein at least a portion of the control information identified at block 1004 is received (e.g., via transceiver 116 and/or a control processing module 124) on respective layers to which the control information is determined to be mapped at block 1004.

Figure 11:
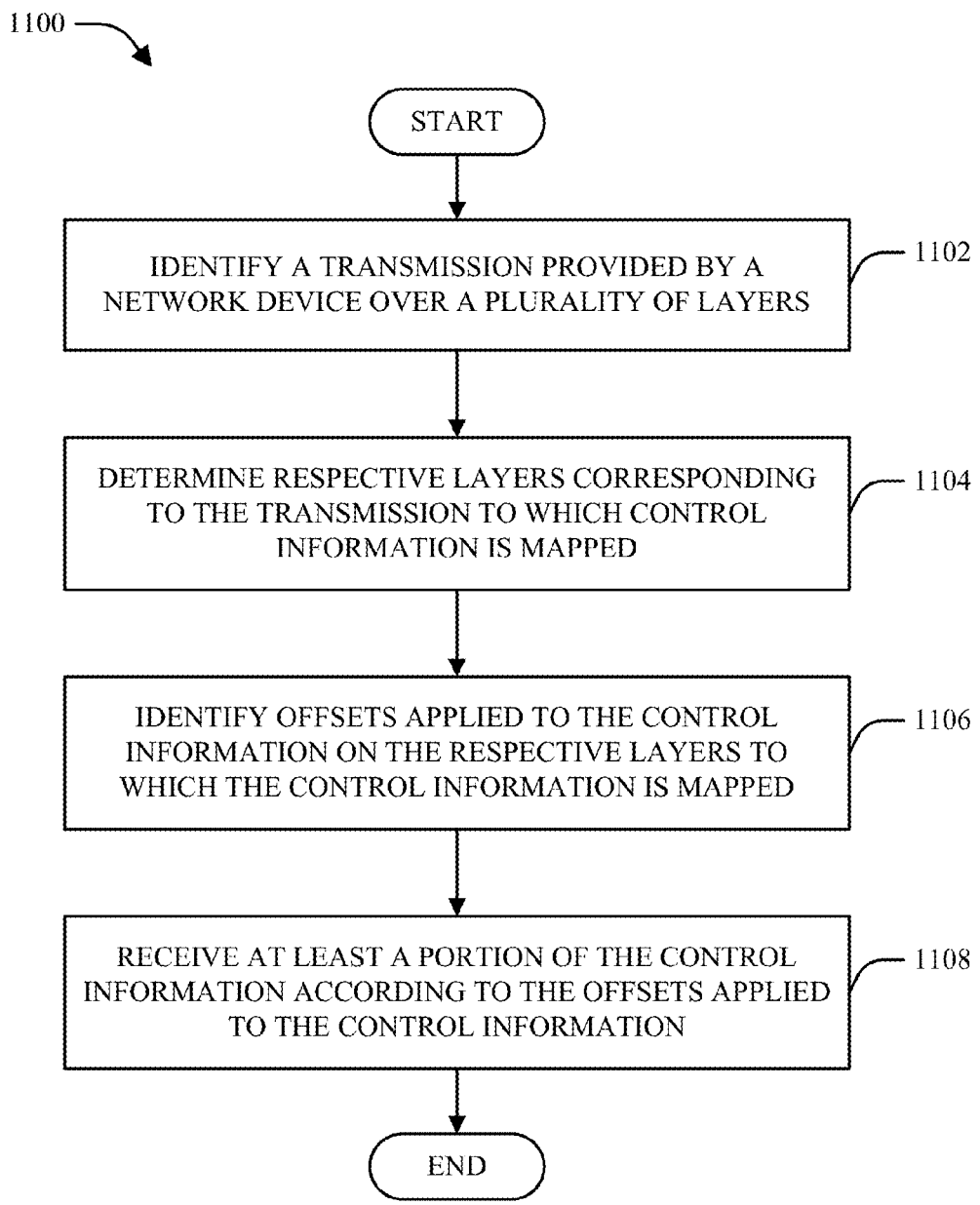

FIG. 11 illustrates a second methodology 1100 for processing a multi-layer transmission received within a wireless communication environment. Methodology 1100 can be performed by, for example, an eNB and/or any other appropriate network entity. Methodology 1100 begins at block 1102, wherein a transmission provided by a network device over a plurality of layers is identified. At block 1104, respective layers corresponding to the transmission identified at block 1102 to which control information is mapped are determined. Next, at block 1106, offsets applied to the control information on the respective layers to which the control information is mapped as determined at block 1104 are identified. Methodology 1100 can then conclude at block 1108, wherein at least a portion of the control information identified at block 1104 is received according to the offsets applied to the control information identified at block 1106.

Figure 12:
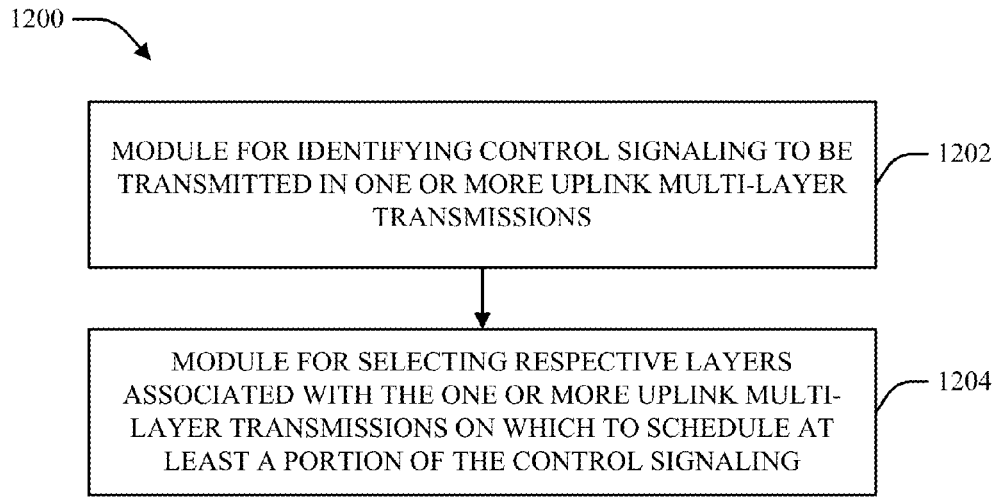
FIGS. 12-13 are block diagrams of respective apparatuses that facilitate UL MIMO communication of control signaling and data in a wireless communication system.
Figure 13:
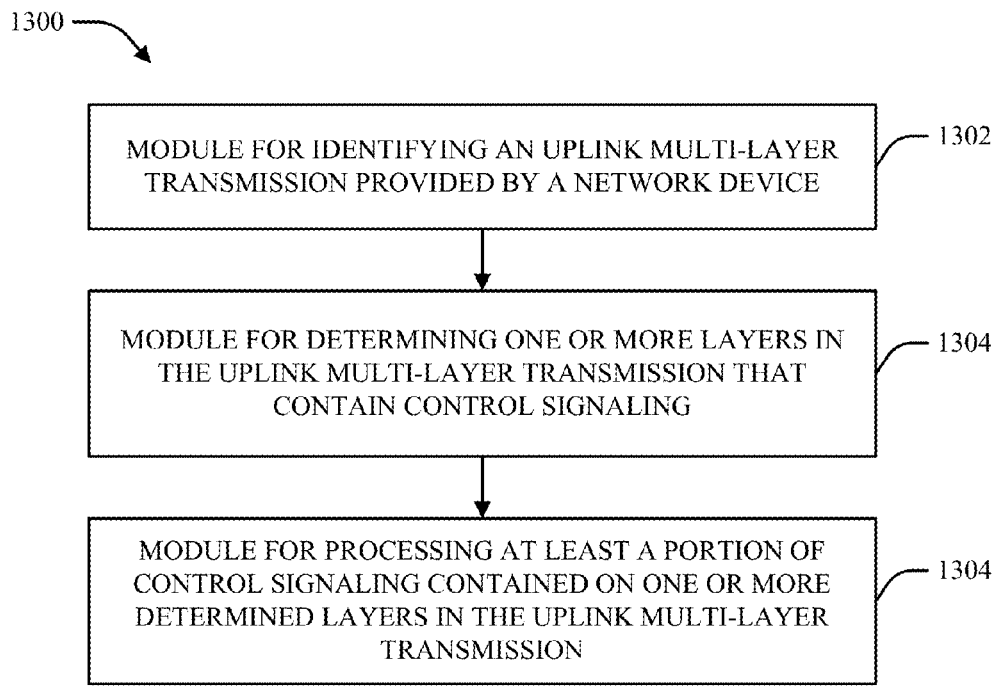

Referring next to FIGS. 12-13, respective apparatuses 1200-1300 that can facilitate various aspects described herein are illustrated. It is to be appreciated that apparatuses 1200-1300 are represented as including functional blocks, which can be functional blocks that represent functions implemented by a processor, software, or combination thereof (e.g., firmware).

With reference first to FIG. 12, an apparatus 1200 that facilitates UL MIMO communication of control signaling and data in a wireless communication system is illustrated. Apparatus 1200 can be implemented by a UE (e.g., UE 110) and/or any other suitable network entity and can include a module 1202 for identifying control signaling to be transmitted in one or more uplink multi-layer transmissions and a module 1204 for selecting respective layers associated with the one or more uplink multi-layer transmissions on which to schedule at least a portion of the control signaling.

FIG. 13 illustrates an apparatus 1300 that facilitates UL MIMO communication of control signaling and data in a wireless communication system. Apparatus 1300 can be implemented by a base station (e.g., base station 120) and/or any other suitable network entity and can include a module 1302 for identifying an uplink multi-layer transmission provided by a network device, a module 1304 for determining one or more layers in the uplink multi-layer transmission that contain control signaling, and a module 1306 for processing at least a portion of control signaling contained on one or more determined layers in the uplink multi-layer transmission.

Figure 14:
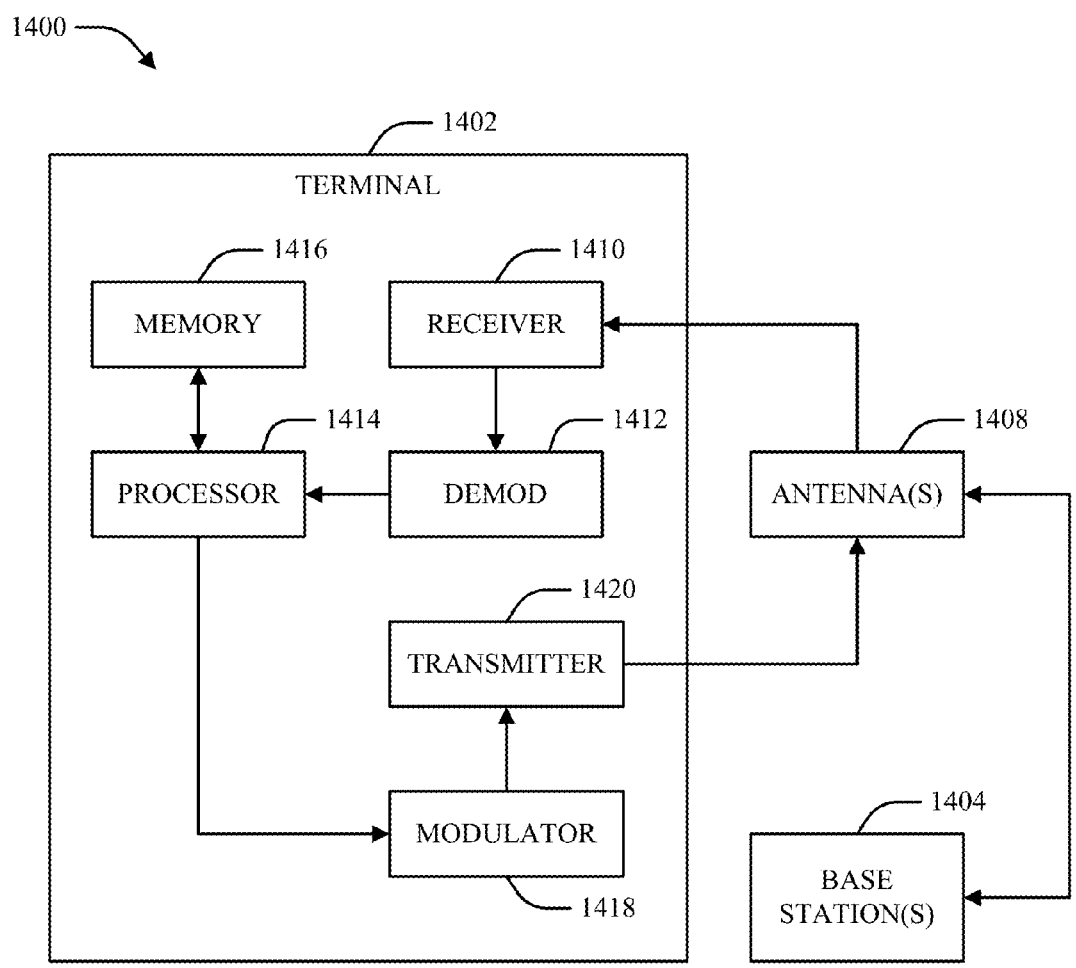
FIGS. 14-15 are block diagrams of respective wireless communication devices that can be utilized to implement various aspects described herein.

FIG. 14 is a block diagram of a system 1400 that can be utilized to implement various aspects of the functionality described herein. In one example, system 1400 includes a mobile terminal 1402. As illustrated, mobile terminal 1402 can receive signal(s) from one or more base stations 1404 and transmit to the one or more base stations 1404 via one or more antennas 1408. Further, mobile terminal 1402 can comprise a receiver 1410 that receives information from antenna(s) 1408. In one example, receiver 1410 can be operatively associated with a demodulator (Demod) 1412 that demodulates received information. Demodulated symbols can then be analyzed by a processor 1414. Processor 1414 can be coupled to memory 1416, which can store data and/or program codes related to mobile terminal 1402. In one example, processor 1414 can additionally be operable to perform methodologies 700-900 and/or other similar and appropriate methodologies. Mobile terminal 1402 can also include a modulator 1418 that can multiplex a signal for transmission by a transmitter 1420 through antenna(s) 1408.

Figure 15:
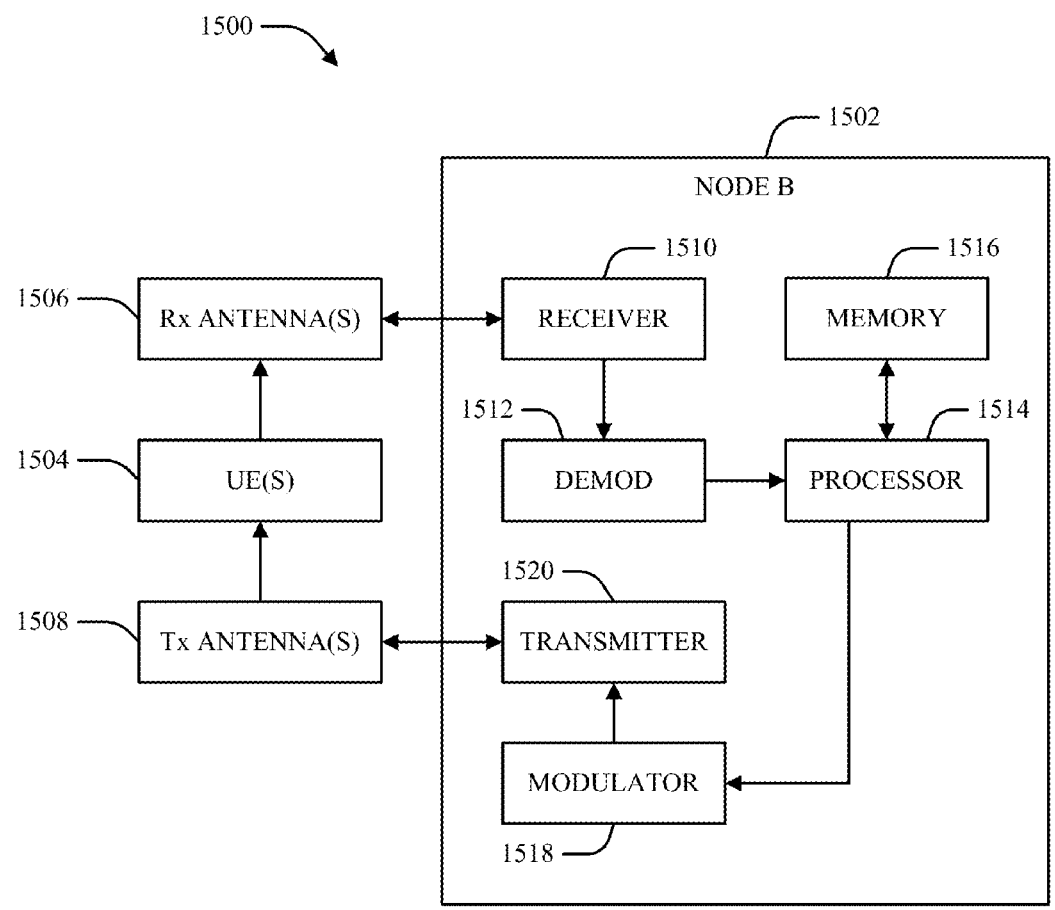

FIG. 15 is a block diagram of another system 1500 that can be utilized to implement various aspects of the functionality described herein. In one example, system 1500 includes a base station or Node B 1502. As illustrated, Node B 1502 can receive signal(s) from one or more UEs 1504 via one or more receive (Rx) antennas 1506 and transmit to the one or more UEs 1504 via one or more transmit (Tx) antennas 1508. Additionally, Node B 1502 can comprise a receiver 1510 that receives information from receive antenna(s) 1506. In one example, the receiver 1510 can be operatively associated with a demodulator (Demod) 1512 that demodulates received information. Demodulated symbols can then be analyzed by a processor 1514. Processor 1514 can be coupled to memory 1516, which can store information related to code clusters, access terminal assignments, lookup tables related thereto, unique scrambling sequences, and/or other suitable types of information. In one example, processor 1514 can additionally be operable to perform methodologies 1000-1100 and/or other similar and appropriate methodologies. Node B 1502 can also include a modulator 1518 that can multiplex a signal for transmission by a transmitter 1520 through transmit antenna(s) 1508.

Figure 16:
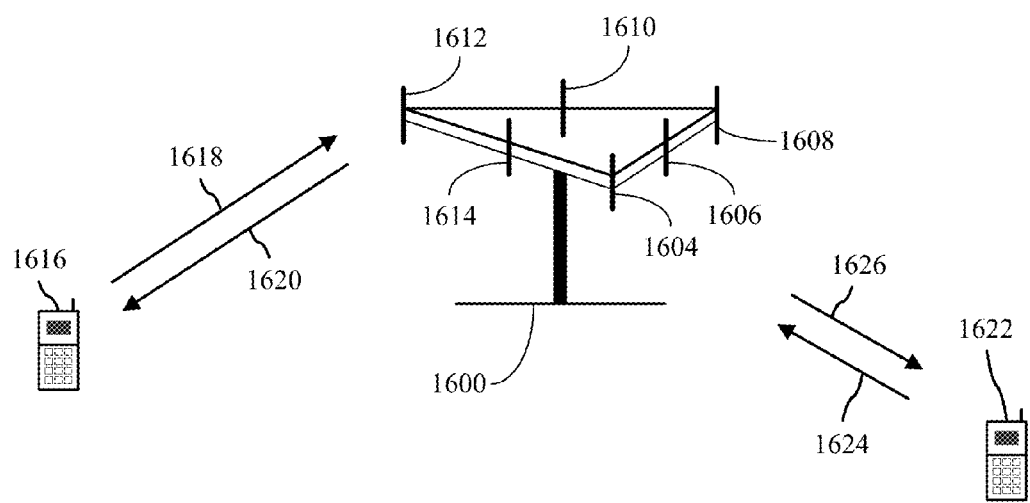
FIG. 16 illustrates a wireless multiple-access communication system in accordance with various aspects set forth herein.

Referring now to FIG. 16, an illustration of a wireless multiple-access communication system is provided in accordance with various aspects. In one example, an access point 1600 (AP) includes multiple antenna groups. As illustrated in FIG. 16, one antenna group can include antennas 1604 and 1606, another can include antennas 1608 and 1610, and another can include antennas 1612 and 1614. While only two antennas are shown in FIG. 16 for each antenna group, it should be appreciated that more or fewer antennas may be utilized for each antenna group. In another example, an access terminal 1616 can be in communication with antennas 1612 and 1614, where antennas 1612 and 1614 transmit information to access terminal 1616 over forward link 1620 and receive information from access terminal 1616 over reverse link 1618. Additionally and/or alternatively, access terminal 1622 can be in communication with antennas 1606 and 1608, where antennas 1606 and 1608 transmit information to access terminal 1622 over forward link 1626 and receive information from access terminal 1622 over reverse link 1624. In a frequency division duplex system, communication links 1618, 1620, 1624 and 1626 can use different frequency for communication. For example, forward link 1620 may use a different frequency then that used by reverse link 1618.

Each group of antennas and/or the area in which they are designed to communicate can be referred to as a sector of the access point. In accordance with one aspect, antenna groups can be designed to communicate to access terminals in a sector of areas covered by access point 1600. In communication over forward links 1620 and 1626, the transmitting antennas of access point 1600 can utilize beamforming in order to improve the signal-to-noise ratio of forward links for the different access terminals 1616 and 1622. Also, an access point using beamforming to transmit to access terminals scattered randomly through its coverage causes less interference to access terminals in neighboring cells than an access point transmitting through a single antenna to all its access terminals.

An access point, e.g., access point 1600, can be a fixed station used for communicating with terminals and can also be referred to as a base station, an eNB, an access network, and/or other suitable terminology. In addition, an access terminal, e.g., an access terminal 1616 or 1622, can also be referred to as a mobile terminal, user equipment, a wireless communication device, a terminal, a wireless terminal, and/or other appropriate terminology.

Figure 17:
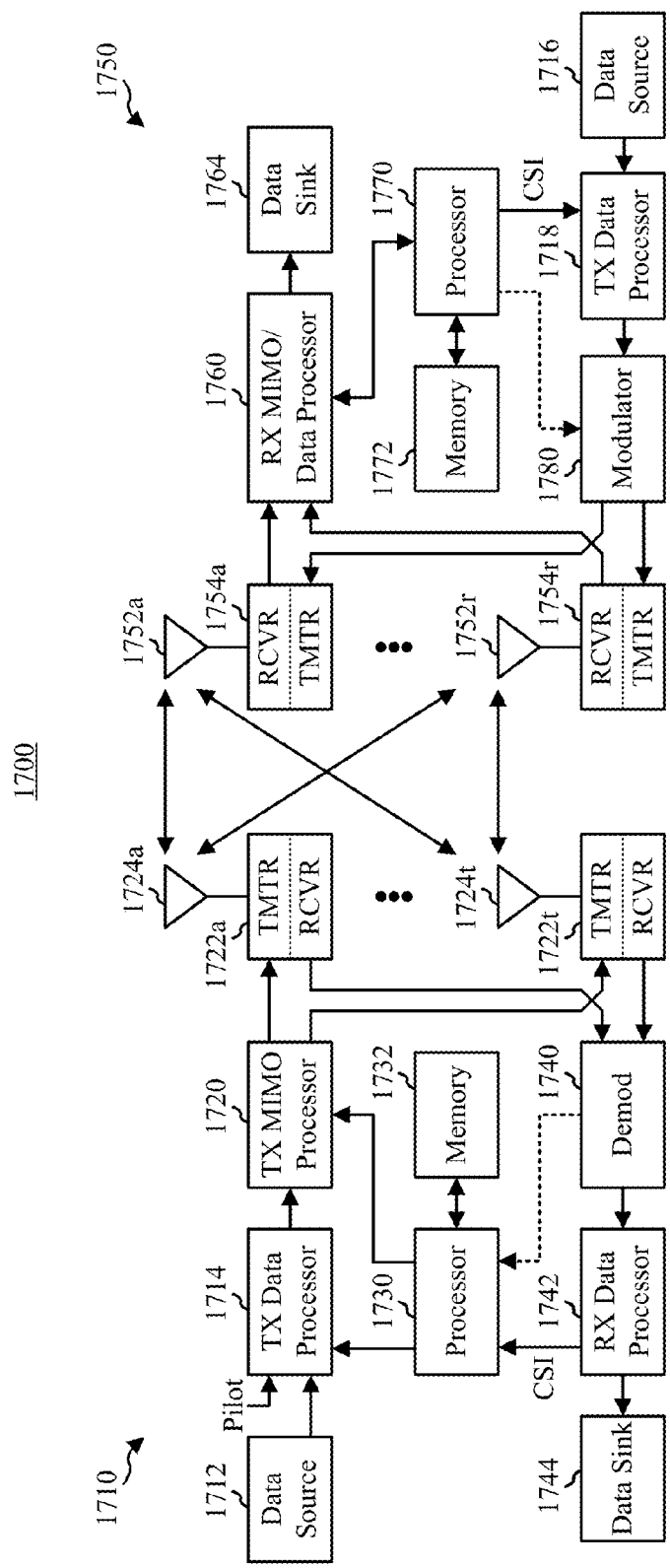
FIG. 17 is a block diagram illustrating an example wireless communication system in which various aspects described herein can function.

Referring now to FIG. 17, a block diagram illustrating an example wireless communication system 1700 in which various aspects described herein can function is provided. In one example, system 1700 is a multiple-input multiple-output (MIMO) system that includes a transmitter system 1710 and a receiver system 1750. It should be appreciated, however, that transmitter system 1710 and/or receiver system 1750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1710 and/or receiver system 1750 described herein could be utilized in connection with a single output to single input antenna system.

In accordance with one aspect, traffic data for a number of data streams are provided at transmitter system 1710 from a data source 1712 to a transmit (TX) data processor 1714. In one example, each data stream can then be transmitted via a respective transmit antenna 1724. Additionally, TX data processor 1714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1750 to estimate channel response. Back at transmitter system 1710, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1730.

Next, modulation symbols for all data streams can be provided to a TX MIMO processor 1720, which can further process the modulation symbols (e.g., for OFDM). TX MIMO processor 1720 can then provides $N_T$ modulation symbol streams to $N_T$ transceivers 1722a through 1722t. In one example, each transceiver 1722 can receive and process a respective symbol stream to provide one or more analog signals. Each transceiver 1722 can then further condition (e.g., amplify, filter, and upconvert) the analog signals to provide a modulated signal suitable for transmission over a MIMO channel. Accordingly, $N_T$ modulated signals from transceivers 1722a through 1722t can then be transmitted from $N_T$ antennas 1724a through 1724t, respectively.

In accordance with another aspect, the transmitted modulated signals can be received at receiver system 1750 by $N_R$ antennas 1752a through 1752r. The received signal from each antenna 1752 can then be provided to respective transceivers 1754. In one example, each transceiver 1754 can condition (e.g., filter, amplify, and downconvert) a respective received signal, digitize the conditioned signal to provide samples, and then processes the samples to provide a corresponding "received" symbol stream. An RX MIMO/data processor 1760 can then receive and process the $N_R$ received symbol streams from $N_R$ transceivers 1754 based on a particular receiver processing technique to provide $N_T$ "detected" symbol streams. In one example, each detected symbol stream can include symbols that are estimates of the modulation symbols transmitted for the corresponding data stream. RX processor 1760 can then process each symbol stream at least in part by demodulating, deinterleaving, and decoding each detected symbol stream to recover traffic data for a corresponding data stream. Thus, the processing by RX processor 1760 can be complementary to that performed by TX MIMO processor 1720 and TX data processor 1714 at transmitter system 1710. RX processor 1760 can additionally provide processed symbol streams to a data sink 1764.

In accordance with one aspect, the channel response estimate generated by RX processor 1760 can be used to perform space/time processing at the receiver, adjust power levels, change modulation rates or schemes, and/or other appropriate actions. Additionally, RX processor 1760 can further estimate channel characteristics such as, for example, signal-to-noise-and-interference ratios (SNRs) of the detected symbol streams. RX processor 1760 can then provide estimated channel characteristics to a processor 1770. In one example, RX processor 1760 and/or processor 1770 can further derive an estimate of the "operating" SNR for the system. Processor 1770 can then provide channel state information (CSI), which can comprise information regarding the communication link and/or the received data stream. This information can include, for example, the operating SNR. The CSI can then be processed by a TX data processor 1718, modulated by a modulator 1780, conditioned by transceivers 1754a through 1754r, and transmitted back to transmitter system 1710. In addition, a data source 1716 at receiver system 1750 can provide additional data to be processed by TX data processor 1718.

Back at transmitter system 1710, the modulated signals from receiver system 1750 can then be received by antennas 1724, conditioned by transceivers 1722, demodulated by a demodulator 1740, and processed by a RX data processor 1742 to recover the CSI reported by receiver system 1750. In one example, the reported CSI can then be provided to processor 1730 and used to determine data rates as well as coding and modulation schemes to be used for one or more data streams. The determined coding and modulation schemes can then be provided to transceivers 1722 for quantization and/or use in later transmissions to receiver system 1750. Additionally and/or alternatively, the reported CSI can be used by processor 1730 to generate various controls for TX data processor 1714 and TX MIMO processor 1720. In another example, CSI and/or other information processed by RX data processor 1742 can be provided to a data sink 1744.

In one example, processor 1730 at transmitter system 1710 and processor 1770 at receiver system 1750 direct operation at their respective systems. Additionally, memory 1732 at transmitter system 1710 and memory 1772 at receiver system 1750 can provide storage for program codes and data used by processors 1730 and 1770, respectively. Further, at receiver system 1750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   identifying control information to be transmitted to one or more network entities;
   obtaining information relating to a plurality of layers designated for uplink multiple input multiple output (MIMO) transmission;
   selecting the plurality of layers on which to schedule uplink MIMO transmission of a first type of the control information, wherein the first type of control information comprises one or more acknowledgement (ACK)/negative acknowledgement (NACK) bits corresponding to one or more downlink transmissions;
   selecting only one layer from the plurality of layers on which to schedule uplink MIMO transmission of a second type of the control information, wherein the second type of control information comprises channel state information (CSI); and
   transmitting, via one or more antennas, at least a portion of the control information on the selected plurality of layers and the selected only one layer.

2. The method of claim 1, wherein the selecting the only one layer comprises:
   identifying a layer in the plurality of layers determined to have a lowest code rate or modulation order among the layers in the plurality of layers; and
   selecting the layer on which to schedule uplink MIMO transmission of the second type of control information.

3. The method of claim 1, wherein the selecting the only one layer comprises:
   identifying a layer in the plurality of layers determined to have a highest code rate or modulation order among the layers in the plurality of layers; and
   selecting the layer on which to schedule uplink MIMO transmission of the second type of control information.

4. The method of claim 1, further comprising applying respective offsets to control information scheduled for transmission on respective layers in the plurality of layers.

5. The method of claim 4, wherein the applying comprises applying a layer-independent offset to at least a portion of the control information scheduled for transmission on respective layers in the plurality of layers.

6. The method of claim 4, wherein the applying comprises:
   applying respective variable offsets to at least a portion of the control information scheduled for transmission on respective layers in the plurality of layers; and
   determining a value for the respective variable offsets based on at least one of properties of respective layers on which transmission of the control information is scheduled or a number of layers on which transmission of the control information is scheduled.

7. The method of claim 1, wherein:
the control information comprises one or more acknowledgement (ACK)/negative acknowledgement (NACK) bits corresponding to one or more downlink transmissions over at least one of different subframes or different carriers; and
the selecting comprises jointly coding the one or more ACK/NACK bits and selecting one or more layers from the plurality of layers on which to schedule uplink MIMO transmission of the one or more ACK/NACK bits.

8. The method of claim 1, wherein:
the control information comprises one or more acknowledgement (ACK)/negative acknowledgement (NACK) bits corresponding to one or more downlink transmissions over at least one of different subframes or different carriers; and
the selecting comprises splitting the one or more ACK/NACK bits into a plurality of groups and selecting one or more layers from the plurality of layers on which to schedule uplink MIMO transmission of respective groups of the ACK/NACK bits.

9. The method of claim 1, further comprising determining a modulation and coding scheme (MCS) for transmission of at least a portion of the control information on one or more layers respectively selected for the control information.

10. The method of claim 9, wherein:
the control information includes acknowledgement (ACK)/negative acknowledgement (NACK) information and rank information; and
the determining comprises:
selecting a modulation scheme for the ACK/NACK information and rank information from the group consisting of binary phase shift keying (BPSK) and quadrature phase shift keying (QPSK); and
performing coding and scrambling for the ACK/NACK information and rank information such that Euclidian distances between modulation constellations associated with the ACK/NACK information and the rank information are substantially maximized.

11. The method of claim 9, wherein:
the control information includes at least one of acknowledgement (ACK) / negative acknowledgement (NACK) information or rank information; and
the determining comprises selecting a MCS for the control information by performing at least one of:
selecting a MCS associated with channel quality information or precoding information for transmission of at least a portion of ACK/NACK information or rank information;
coding at least one of ACK/NACK information or rank information according to a (n, k) coding scheme for predetermined values of n and k; or
modulating at least one of ACK/NACK information or rank information according to quadrature phase shift keying (QPSK) such that a parity bit provided via an associated QPSK constellation is utilized to carry additional ACK/NACK information or rank information.

12. The method of claim 9, wherein:
the control information includes channel quality information; and
the determining comprises selecting a MCS for transmission of at least a portion of the channel quality information that is associated with data to be transmitted with the channel quality information.

13. The method of claim 1, wherein the plurality of layers corresponds to at least one of spatial layers or codewords.

14. A wireless communications apparatus, comprising:
a memory that stores data relating to control information to be transmitted to one or more network entities and a plurality of layers designated for uplink multiple input multiple output (MIMO) transmission;
a processor configured to select the plurality of layers on which to schedule uplink MIMO transmission of a first type of the control information, wherein the first type of control information comprises one or more acknowledgement (ACK)/negative acknowledgement (NACK) bits corresponding to one or more downlink transmissions, and to select only one layer from the plurality of layers on which to schedule uplink MIMO transmission of a second type of the control information, wherein the second of type of control information comprises channel state information (CSI); and
a transmitter to transmit, via one or more antennas, at least a portion of the control information on the selected plurality of layers and the selected only one layer.

15. The wireless communications apparatus of claim 14, wherein the processor is further configured to identify a layer in the plurality of layers determined to have a lowest code rate or modulation order among the layers in the plurality of layers and to select the layer on which to schedule uplink MIMO transmission of the second type of control information.

16. The wireless communications apparatus of claim 14, wherein the processor is further configured to identify a layer in the plurality of layers determined to have a highest code rate or modulation order among the layers in the plurality of layers and to select the layer on which to schedule uplink MIMO transmission of the second type of control information.

17. The wireless communications apparatus of claim 14, wherein the processor is further configured to apply respective offsets to control information scheduled for transmission on respective layers in the plurality of layers.

18. The wireless communications apparatus of claim 14, wherein:
the memory further stores data relating to one or more acknowledgement (ACK)/negative acknowledgement (NACK) bits corresponding to one or more downlink transmissions over at least one of different subframes or different carriers; and
the processor is further configured to perform at least one of:
jointly coding the one or more ACK/NACK bits and selecting one or more layers from the plurality of layers on which to schedule uplink MIMO transmission of the one or more ACK/NACK bits; or
splitting the one or more ACK/NACK bits into a plurality of groups and selecting a plurality of layers from the plurality of layers on which to schedule uplink MIMO transmission of respective groups of the ACK/NACK bits.

19. The wireless communications apparatus of claim 14, wherein the processor is further configured to determine a modulation and coding scheme (MCS) for transmission of at least a portion of the control information on one or more layers respectively selected for the control information.

20. The wireless communications apparatus of claim 19, wherein:
the memory further stores data relating to acknowledgement (ACK)/negative acknowledgement (NACK) and rank information; and the processor is further configured to select a modulation scheme for the ACK/NACK information and rank information from the group consisting of binary phase shift keying (BPSK) and quadrature phase shift keying (QPSK) and to perform coding and scrambling for the ACK/NACK information and rank information such that Euclidian distances between modulation constellations associated with the ACK/NACK information and the rank information are substantially maximized.

21. The wireless communications apparatus of claim 19, wherein:
the memory further stores data relating to at least one of acknowledgement (ACK)/negative acknowledgement (NACK) or rank information; and
the processor is further configured to select a MCS for the control information by performing at least one of:
selecting a MCS associated with channel quality information or precoding information for transmission of at least a portion of ACK/NACK information or rank information;
coding at least one of ACK/NACK information or rank information according to a (n, k) coding scheme for predetermined values of n and k; or
modulating at least one of ACK/NACK information or rank information according to quadrature phase shift keying (QPSK) such that a parity bit provided via an associated QPSK constellation is utilized to carry additional ACK/NACK information or rank information.

22. The wireless communications apparatus of claim 19, wherein:
the memory further stores data relating to channel quality information; and
the processor is further configured to select a MCS for transmission of at least a portion of the channel quality information that is associated with data to be transmitted with the channel quality information.

23. The wireless communications apparatus of claim 13, wherein the plurality of layers corresponds to at least one of spatial layers or codewords.

24. An apparatus, comprising:
means for identifying control information to be transmitted in one or more uplink multi-layer transmissions;
means for obtaining information relating to a plurality of layers designated for uplink multiple input multiple output (MIMO) transmission;
means for selecting the plurality of layers on which to schedule uplink MIMO transmission of a first type of the control information, wherein the first type of control information comprises one or more acknowledgement (ACK)/negative acknowledgement (NACK) bits corresponding to one or more downlink transmissions;
means for selecting only one layer from the plurality of layers on which to schedule uplink MIMO transmission of a second type of the control information, wherein the second type of control information comprises channel state information (CSI); and
means for transmitting, via one or more antennas, at least a portion of the control information on the selected plurality of layers and the selected only one layer.

25. The apparatus of claim 24, further comprising means for applying respective offsets to control signaling scheduled for transmission on respective selected layers.

26. The apparatus of claim 24, wherein:
the control signaling comprises one or more acknowledgement (ACK)/negative acknowledgement (NACK) bits corresponding to one or more downlink transmissions over at least one of different subframes or different carriers; and
the means for selecting comprises at least one of:
means for jointly coding the one or more ACK/NACK bits and means for selecting one or more layers associated with the one or more uplink multi-layer transmissions on which to schedule the one or more ACK/NACK bits; or
means for splitting the one or more ACK/NACK bits into a plurality of groups and means for selecting a plurality of layers associated with the one or more uplink multi- layer transmissions on which to schedule respective groups of the ACK/NACK bits.

27. The apparatus of claim 24, further comprising means for selecting a modulation and coding scheme (MCS) for transmission of at least a portion of the control signaling on one or more layers respectively selected for the control signaling.

28. The apparatus of claim 24, wherein the respective layers associated with the one or more uplink multi-layer transmissions correspond to at least one of spatial layers or codewords.

29. A computer program product, comprising:
a non-transitory computer-readable medium, comprising:
code for causing a computer to identify control information to be transmitted in one or more uplink multi-layer transmissions;
code for causing a computer to obtain information relating to a plurality of layers designated for uplink multiple input multiple output (MIMO) transmission;
code for causing a computer to select the plurality of layers on which to schedule a first type of the control information, wherein the first type of control information comprises one or more acknowledgement (ACK)/negative acknowledgement (NACK) bits corresponding to one or more downlink transmissions;
code for causing a computer to select only one layer of the plurality of layers on which to schedule a second type of the control information, wherein second type of control information comprises channel state information (CSI); and
code for causing a computer to transmit, via one or more antennas, at least a portion of the control information on the selected plurality of layers and the selected only one layer.

30. The computer program product of claim 29, wherein the computer-readable medium further comprises code for causing a computer to apply respective offsets to control signaling scheduled for transmission on respective selected layers.

31. The computer program product of claim 29, wherein:
the control signaling comprises one or more acknowledgement (ACK)/negative acknowledgement (NACK) bits corresponding to one or more downlink transmissions over at least one of different subframes or different carriers; and
the code for causing a computer to select comprises at least one of:
code for causing a computer to jointly code the one or more ACK/NACK bits and code for causing a computer to select one or more layers associated with the one or more uplink multi-layer transmissions on which to schedule the one or more ACK/NACK bits; or
code for causing a computer to split the one or more ACK/NACK bits into a plurality of groups and code for causing a computer to select a plurality of layers associated with the one or more uplink multi-layer transmissions on which to schedule respective groups of the ACK/NACK bits.

32. The computer program product of claim 29, wherein the computer-readable medium further comprises code for causing a computer to select a modulation and coding scheme (MCS) for transmission of at least a portion of the control signaling on one or more layers respectively selected for the control signaling.

33. The computer program product of claim 29, wherein the respective layers associated with the one or more uplink multi-layer transmissions correspond to at least one of spatial layers or codewords.

34. A method, comprising:
    identifying a transmission provided by a network device over a plurality of layers;
    determining respective layers corresponding to the transmission to which control information is mapped, comprising:
        determining the plurality of layers corresponding to the transmission to which a first type of control information is mapped, wherein the first type of control information comprises one or more acknowledgement (ACK)/negative acknowledgement (NACK) bits corresponding to one or more downlink transmissions;
        determining only one layer of the plurality of layers corresponding to the transmission to which a second type of control information is mapped, wherein the second type of control information comprises channel state information (CSI); and
    receiving at least a portion of the control information on respective layers to which the control information is determined to be mapped.

35. The method of claim 34, wherein the receiving comprises:
    identifying offsets applied to the control information on the respective layers to which the control information is mapped; and
    receiving at least a portion of the control information according to offsets applied thereto.

36. The method of claim 35, wherein the identifying offsets comprises identifying layer-independent offsets applied to control information mapped to respective layers corresponding to the transmission.

37. The method of claim 35, wherein the identifying offsets comprises identifying respective per-layer offsets applied to control information mapped to respective layers corresponding to the transmission.

38. The method of claim 37, further comprising determining the respective per-layer offsets as a function of at least one of properties of the layers to which the control information is mapped or a number of layers to which the control information is mapped.

39. The method of claim 34, wherein:
    the control information comprises one or more ACK NACK bits corresponding to one or more downlink transmissions over at least one of different subframes or different carriers; and
    the determining comprises determining one or more layers to which the ACK/NACK bits are mapped.

40. The method of claim 34, further comprising identifying a modulation and coding scheme (MCS) applied to at least a portion of the control information provided in the transmission.

41. The method of claim 40, wherein:
    the control information includes at least one of acknowledgement (ACK)/negative acknowledgement (NACK) information or rank information; and
    the identifying comprises identifying modulation constellations associated with the ACK/NACK information and the rank information that are constructed based on binary phase shift keying (BPSK) or quadrature phase shift keying (QPSK) and associated coding and scrambling such that Euclidian distances between a modulation constellation associated with the ACK/NACK information and a modulation constellation associated with the rank information is substantially maximized.

42. The method of claim 40, wherein:
    the control information includes channel quality information; and
    the identifying a MCS comprises identifying a common MCS utilized within the transmission for the channel quality information and data.

43. The method of claim 34, wherein the respective layers correspond to at least one of spatial layers or codewords.

44. A wireless communications apparatus, comprising:
    a memory that stores data relating to a transmission provided by a network device over a plurality of layers;
    a processor configured to:
        determine respective layers corresponding to the transmission to which control information is mapped, at least in part by:
            determining the plurality of layers corresponding to the transmission to which a first type of control information is mapped, wherein the first type of control information comprises one or more acknowledgement (ACK)/negative acknowledgement (NACK) bits corresponding to one or more downlink transmissions, and
            determining only one layer of the plurality of layers corresponding to the transmission to which a second type of control information is mapped, wherein the second type of control information comprises channel state information (CSI); and
    a receiver to receive at least a portion of the control information on respective layers to which the control information is determined to be mapped.

45. The wireless communications apparatus of claim 44, wherein the processor is further configured to identify offsets applied to the control information on the respective layers to which the control information is mapped and to receive at least a portion of the control information according to the offsets applied thereto.

46. The wireless communications apparatus of claim 45, wherein the processor is further configured to identify layer-independent offsets applied to control information mapped to respective layers corresponding to the transmission.

47. The wireless communications apparatus of claim 45, wherein the processor is further configured to identify respective per-layer offsets applied to control information mapped to respective layers corresponding to the transmission.

48. The wireless communications apparatus of claim 44, wherein the processor is further configured to identify a modulation and coding scheme (MCS) applied to at least a portion of the control information provided in the transmission.

49. The wireless communications apparatus of claim 48, wherein:
    the memory further stores data relating to at least one of acknowledgement (ACK)/negative acknowledgement (NACK) information or rank information; and the processor is further configured to identify modulation constellations associated with the ACK/NACK information and the rank information that are constructed based on binary phase shift keying (BPSK) or quadrature phase shift keying (QPSK) and associated coding and scrambling such that Euclidian distances between a modulation constellation associated with the ACK/NACK information and a modulation constellation associated with the rank information is substantially maximized.

50. The wireless communications apparatus of claim 48, wherein:
the memory further stores data relating to channel quality information; and
the processor is further configured to identify a common MCS utilized within the transmission for the channel quality information and data.

51. The wireless communications apparatus of claim 44, wherein the respective layers correspond to at least one of spatial layers or codewords.

52. An apparatus, comprising:
means for identifying an uplink multi-layer transmission provided by a network device over a plurality of layers;
means for determining respective layers corresponding to the transmission to which control information is mapped, comprising:
determining the plurality of layers corresponding to the transmission to which a first type of control information is mapped, wherein the first type of control information comprises one or more acknowledgement (ACK)/negative acknowledgement (NACK) bits corresponding to one or more downlink transmissions;
determining only one layer of the plurality of layers corresponding to the transmission to which a second type of control information is mapped, wherein the second type of control information comprises channel state information (CSI); and
means for processing at least a portion of control signaling contained on one or more determined layers in the uplink multi-layer transmission.

53. The apparatus of claim 52, further comprising means for identifying offsets applied to control signaling contained on one or more determined layers in the uplink multi-layer transmission, wherein the means for processing comprises means for processing at least a portion of the control signaling contained on one or more determined layers in the uplink multi-layer transmission according to offsets applied thereto.

54. The apparatus of claim 53, wherein the means for identifying offsets comprises at least one of means for identifying layer-independent offsets applied to respective control signaling mapped to respective layers in the uplink multi-layer transmission or means for identifying respective per-layer offsets applied to control signaling mapped to respective layers in the uplink multi-layer transmission.

55. The apparatus of claim 52, further comprising means for identifying a modulation and coding scheme (MCS) applied to at least a portion of control signaling provided in the uplink multi-layer transmission.

56. The apparatus of claim 52, wherein respective layers in the uplink multi-layer transmission correspond to at least one of spatial layers or codewords.

57. A computer program product, comprising:
a non-transitory computer-readable medium, comprising:
code for causing a computer to identify an uplink multi-layer transmission provided by a network device over a plurality of layers;
code for causing a computer to determine respective layers corresponding to the transmission to which control information is mapped, comprising:
determining the plurality of layers in the uplink multi-layer transmission to which a first type of the control information is mapped wherein the first type of control information comprises one or more acknowledgement (ACK)/negative acknowledgement (NACK) bits corresponding to one or more downlink transmissions, and
determining only one layer of the plurality of layers in the uplink multi-layer transmission to which a second type of the control signaling is mapped, wherein the second type of control information comprises channel state information (CSI); and
code for causing a computer to process at least a portion of control signaling contained on one or more determined layers in the uplink multi-layer transmission.

58. The computer readable medium of claim 57, wherein:
the computer readable medium further comprises code for causing a computer to identify offsets applied to control signaling contained on one or more determined layers in the uplink multi-layer transmission; and
the code for causing a computer to process comprises code for causing a computer to process at least a portion of the control signaling contained on one or more determined layers in the uplink multi-layer transmission according to the offsets applied thereto.

59. The computer readable medium of claim 57, wherein the computer readable medium further comprises code for causing a computer to identify a modulation and coding scheme (MCS) applied to at least a portion of control signaling provided in the uplink multi-layer transmission.

60. The computer readable medium of claim 57, wherein respective layers in the uplink multi-layer transmission correspond to at least one of spatial layers or codewords.

61. The method of claim 1, wherein the selecting further comprises:
identifying a quality threshold associated with the control information and respective quality levels achievable by respective layers in the plurality of layers; and
selecting the subset of less than all layers in the plurality of layers according to the quality threshold associated with the control information and the respective quality levels achievable by respective layers in the plurality of layers.

* * * * *